US011323025B2

(12) United States Patent
Takahara et al.

(10) Patent No.: US 11,323,025 B2
(45) Date of Patent: May 3, 2022

(54) POWER CONVERTER

(71) Applicant: Mitsubishi Electric Corporation, Tokyo (JP)

(72) Inventors: Takaaki Takahara, Tokyo (JP); Hiroto Mizutani, Tokyo (JP); Hajime Toyoda, Tokyo (JP); Hiroyasu Iwabuki, Tokyo (JP); Yasunori Otsuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 48 days.

(21) Appl. No.: 17/047,703

(22) PCT Filed: May 16, 2019

(86) PCT No.: PCT/JP2019/019558
§ 371 (c)(1),
(2) Date: Oct. 15, 2020

(87) PCT Pub. No.: WO2019/230430
PCT Pub. Date: Dec. 5, 2019

(65) Prior Publication Data
US 2021/0119530 A1    Apr. 22, 2021

(30) Foreign Application Priority Data
May 28, 2018  (JP) .............................. JP2018-101270

(51) Int. Cl.
H02M 1/44    (2007.01)
H02M 1/088   (2006.01)
H02M 7/537   (2006.01)

(52) U.S. Cl.
CPC ............. H02M 1/44 (2013.01); H02M 1/088 (2013.01); H02M 7/537 (2013.01)

(58) Field of Classification Search
CPC .... H02M 1/0048; H02M 1/0054; H02M 1/44; H02M 7/537
See application file for complete search history.

(56) References Cited

U.S. PATENT DOCUMENTS 10,193,544 B2 *  1/2019  Bhat .................... H02M 3/158
10,277,112 B2 *  4/2019  Cyr ..................... H02M 7/538
(Continued)

FOREIGN PATENT DOCUMENTS

EP    2 824 815 A1    1/2015
JP    10-66356 A      3/1998
(Continued)

OTHER PUBLICATIONS

Extended European Search Report dated Jun. 18, 2021, in corresponding European Patent Application No. 19810179.2.
(Continued)

Primary Examiner — Gary L Laxton
(74) Attorney, Agent, or Firm — Xsensus LLP

(57) ABSTRACT

A DC capacitor and a leg are connected in parallel to a high-voltage-side power line and a low-voltage-side power line. The leg includes a plurality of semiconductor switching elements connected in series between the power lines with an output end, connected to a load, between the plurality of semiconductor switching elements. An attenuator for attenuating a resonance is connected to a main circuit loop formed of the DC capacitor, the high-voltage-side power line, the low-voltage-side power line, a semiconductor switching element in ON state, and a drain-source parasitic capacitance of a semiconductor switching element in OFF state.

19 Claims, 15 Drawing Sheets

(56) References Cited

U.S. PATENT DOCUMENTS

| | | | |
|---|---|---|---|
| 2012/0223667 A1 | 9/2012 | Wang et al. | |
| 2016/0344279 A1 | 11/2016 | Kanda et al. | |
| 2017/0310207 A1* | 10/2017 | Azotea | H02M 1/34 |
| 2018/0006549 A1* | 1/2018 | Torii | H02M 1/34 |

FOREIGN PATENT DOCUMENTS

| | | |
|---|---|---|
| JP | 2012-186915 A | 9/2012 |
| JP | 2014-36552 A | 2/2014 |
| JP | 2015-154626 A | 8/2015 |
| JP | 2017-59920 A | 3/2017 |
| WO | 2015/049736 A1 | 4/2015 |
| WO | 2017/115539 A1 | 7/2017 |

OTHER PUBLICATIONS

International Search Report and Written Opinion dated Aug. 6, 2019 for PCT/JP2019/019558 filed on May 16, 2019, 10 pages with English translation of International Search Report.

Notice of Reasons for Refusal received for Japanese Patent Application No. 2019-557660, dated Jan. 28, 2020, 8 pages with English Translation.

Yusuke Sugihara et al., "Analytical Investigation on Design Instruction to Avoid Oscillatory False Triggering of Fast Switching SiC-MOSFETs", IEEE, 2017, pp. 5113-5118.

* cited by examiner

POWER CONVERTER

CROSS-REFERENCE TO RELATED APPLICATIONS

The present application is based on PCT filing PCT/JP2019/019558, filed May 16, 2019, which claims priority to JP 2018-101270, filed May 28, 2018, the entire contents of each are incorporated herein by reference.

TECHNICAL FIELD

The present disclosure relates to power converters, and more particularly, to a power converter including semiconductor switching elements controlled to be turned on and off.

BACKGROUND ART

A switching element of a wide bandgap semiconductor, for example, a gallium nitride (GaN)-field effect transistor (FET), has a low turn-on voltage threshold compared with a switching element of silicon. Also, the switching element of a wide bandgap semiconductor features high-speed switching operation, and tends to easily malfunction due to switching noise compared with the switching element of silicon.

It is commonly known that the above factors may result in an oscillatory false triggering phenomenon of the wide bandgap semiconductor switching element in which turn-on and turn-off are repeated for an extended period.

A measure against voltage ringing which occurs in turn-off of a common semiconductor switching element has been conventionally studied. For example, WO 2015/049736 (PTL 1) discloses a technique of connecting a CR snubber circuit in parallel with a leg of inverters or the like to reduce or prevent ringing due to a parasitic inductance of a package of a power device.

CITATION LIST

Patent Literature

PTL 1: WO 2015/049736

SUMMARY OF INVENTION

Technical Problem

Ringing is a phenomenon in which in turn-off of semiconductor switching elements, energy accumulated mainly in a parasitic inductance of a package of a power device causes oscillation of a voltage across terminals (e.g., a source-drain voltage of an FET). In other words, ringing differs from the above oscillatory false triggering phenomenon in cause of generation and generation mechanism.

Even when the configuration described in PTL 1 is applied to a power converter including semiconductor switching elements which may suffer from the oscillatory false triggering phenomenon, thus, the oscillatory false triggering phenomenon may not be reduced effectively.

The present disclosure has been made to solve such a problem, and an object of the present disclosure is to provide a configuration in which a steady operation can be provided stably in a power converter including semiconductor switching elements even when the semiconductor switching elements are turned on and off at high speed.

Solution to Problem

According to one aspect of the present disclosure, a power converter includes a first power line on a high-voltage side, a second power line on a low-voltage side, a direct-current (DC) capacitor, a leg including a plurality of semiconductor switching elements, and an attenuator. The DC capacitor is connected between the first and second power lines. The leg is connected in parallel with the DC capacitor between the first and second power lines. The plurality of semiconductor switching elements are connected in series between the first and second power lines with an output end, connected with a load, between the plurality of semiconductor switching elements. The attenuator is connected to a main circuit loop. The main circuit loop is formed of the DC capacitor, the first and second power lines, a semiconductor switching element in ON state among the plurality of semiconductor switching elements, the output end, and a drain-source parasitic capacitance of a semiconductor switching element in OFF state among the plurality of semiconductor switching elements. The attenuator is configured to attenuate a resonance due to a parasitic component of the main circuit loop.

Advantageous Effects of Invention

According to the present disclosure, the oscillatory false triggering phenomenon of the semiconductor switching elements can be reduced or prevented by reducing an admittance at the resonance frequency of the resonance circuit formed by a parasitic component of the main circuit loop to enhance an effect of attenuating voltage fluctuations. This allows the power converter to stably perform a steady operation even when the semiconductor switching elements turned on and off at high speed.

DESCRIPTION OF EMBODIMENTS

Figure 1:
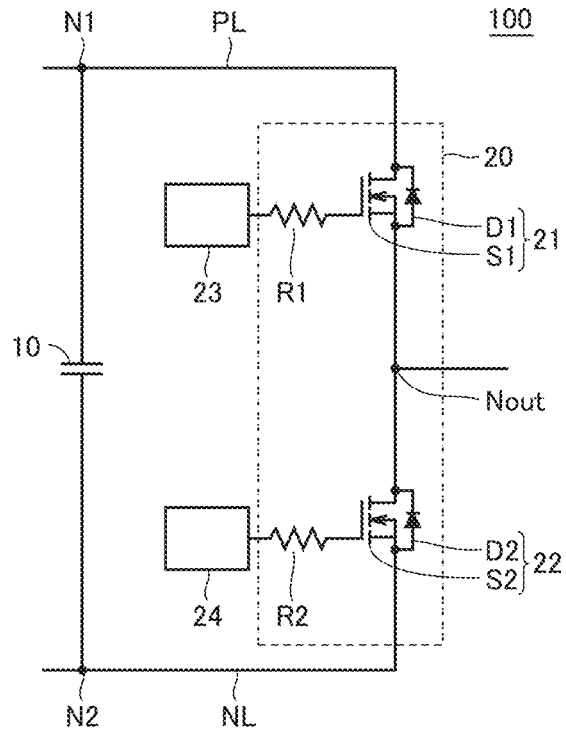
FIG. 1 is a circuit diagram showing a basic configuration of a power converter to which the present embodiment is applied.

Embodiments of the present disclosure will now be described in detail with reference to the drawings, in which the same or corresponding portions are denoted by the same reference characters and description thereof will not be repeated.

Embodiment 1

First, a basic configuration of a power converter to which the present embodiment is applied will be described with reference to FIGS. 1 and 2.

Referring to FIG. 1, a power converter 100 includes a high-voltage-side power line PL and a low-voltage-side power line NL, a DC capacitor 10, a leg 20, and gate drivers 23 and 24. High-voltage-side power line PL and low-voltage-side power line NL are connected to a positive side and a negative side of a DC power supply (not shown). DC capacitor 10 is connected between a node N1 on power line PL and a node N2 on power line NL.

Leg 20 includes semiconductor switching elements 21 and 22 connected in series between power lines PL and NL with a node Nout between semiconductor switching elements 21 and 22. Node Nout corresponds to an "output end" of leg 20 and is connected to a load via, for example, an inductor (not shown) and/or a capacitor (not shown).

Semiconductor switching element 21 includes a switch S1 and a diode D1 connected in anti-parallel with switch S1. A control electrode (gate) of switch S1 is connected to gate driver 23 with a gate resistor R1 therebetween. Similarly, semiconductor switching element 22 includes a switch S2 and a diode D2 connected in anti-parallel with switch S2. A control electrode (gate) of switch S2 is connected to gate driver 24 with a gate resistor R2 therebetween. Gate resistors R1 and R2 are each commonly formed by disposing a resistive element.

Gate drivers 23 and 24 respectively output drive signals for turning on and off switches S1 and S2. Typically, the drive signal is generated as a voltage pulse for complementarily turning on and off semiconductor switching elements 21 and 22 constituting the same leg 20. It should be noted that turn-on and turn-off of switch S1 are also referred to as turn-on and turn-off of semiconductor switching element 21. Similarly, turn-on and turn-off of switch S2 are also referred to as turn-on and turn-off of semiconductor switching element 22.

Semiconductor switching elements 21 and 22 can be formed of, for example, a metal oxide semiconductor (MOS)-FET or an insulated gate bipolar transistor (IGBT) that can be controlled to be turned on and off by the drive signals from gate drivers 23 and 24. Semiconductor switching elements 21 and 22 may be formed of a silicon material or may be formed of a wide bandgap semiconductor, such as silicon carbide (NiC), gallium nitride (GaN), gallium oxide ($Ga_2O_3$), and/or diamond.

Figure 2:
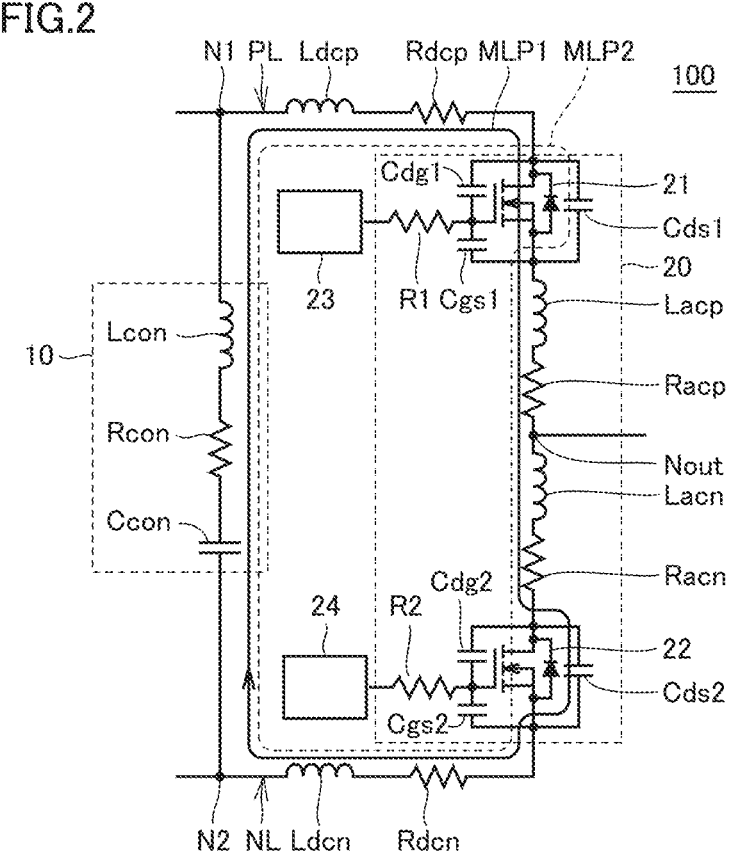
FIG. 2 is an equivalent circuit diagram in which parasitic components of the basic configuration shown in FIG. 1 are shown.

FIG. 2 is an equivalent circuit diagram of the basic configuration shown in FIG. 1. In FIG. 2, parasitic components in the circuit are shown further.

Referring to FIG. 2, a capacitive component Ccon, a resistive component Rcon, and an inductive component Lcon are present between node N1 on power line PL and node N2 on power line NL due to DC capacitor 10 and a wiring group. Inductive component Lcon and resistive component Rcon correspond to an equivalent series inductance (ESL) and an equivalent series resistance (ESR) of DC capacitor 10.

A resistive component Rdcp and an inductive component Ldcp are present between node N1 and the drain terminal of semiconductor switching element 21 which is connected with power line PL. Similarly, a resistive component Rdcn and an inductive component Ldcn are present between node N2 and the source terminal of semiconductor switching element 22 which is connected with power line NL.

A resistive component Racp and an inductive component Lacp are present between node Nout and the source terminal of semiconductor switching element 21 which is connected with node Nout. Similarly, a resistive component Racn and an inductive component Lacn are present between node Nout and the drain terminal of semiconductor switching element 22 which is connected with node Nout.

Further, the capacitive component of semiconductor switching element 21 is represented by a drain-source parasitic capacitance Cds1, a drain-gate parasitic capacitance Cdg1, and a gate-source parasitic capacitance Cgs1. As shown in FIG. 2, a series circuit of Cdg1 and Cgs1 is connected in parallel with Cds1.

Similarly, the capacitive component of semiconductor switching element 22 is represented by a drain-source parasitic capacitance Cds2, a drain-gate parasitic capacitance Cdg2, and a gate-source parasitic capacitance Cgs2. A series circuit of Cdg2 and Cgs2 is connected in parallel with Cds2.

As shown in FIG. 2, with the basic configuration of power converter 100, DC capacitor 10, power line PL, semiconductor switching element 21 (ON state), node Nout, drain-source parasitic capacitance Cds2 of semiconductor switching element 22, and power line NL form a main circuit loop MLP1 during turn-on of semiconductor switching element 21. On the other hand, DC capacitor 10, power line PL, drain-source parasitic capacitance Cds1 of semiconductor switching element 21, node Nout, semiconductor switching element 22 (ON state), and power line NL form a main circuit loop MLP2 during turn-on of semiconductor switching element 22. Since semiconductor switching elements 21 and 22 normally have characteristics designed in common, main circuit loops MLP1 and MLP2 are also referred to as a main circuit loop MLP when these main circuit loops are collectively referred to.

Main circuit loop MLP forms a resonance circuit by the parasitic components shown in FIG. 2. Accordingly, if voltage fluctuations occur in the neighborhood of the resonance frequency of the resonance circuit during turn-off of semiconductor switching element 21 or 22, such voltage fluctuations may continue to lead to an oscillatory false triggering phenomenon in which turn-on and turn-off are repeated periodically after turn-off. This oscillatory false triggering phenomenon easily occurs particularly in a semiconductor switching element which is turned on at a lower voltage threshold. Also, for the semiconductor switching elements which are switched at high speed, the switching frequency tends to approach the resonance frequency depending on the parasitic components, and accordingly, the oscillatory false triggering phenomenon easily occurs. From these perspectives, it is understood that the oscillatory false triggering phenomenon easily occurs when semiconductor switching elements 21 and 22 are each formed of the above wide bandgap semiconductor.

A configuration of the power converter according to Embodiment 1 of the present disclosure will be described with reference to FIGS. 3 to 6.

Figure 3:
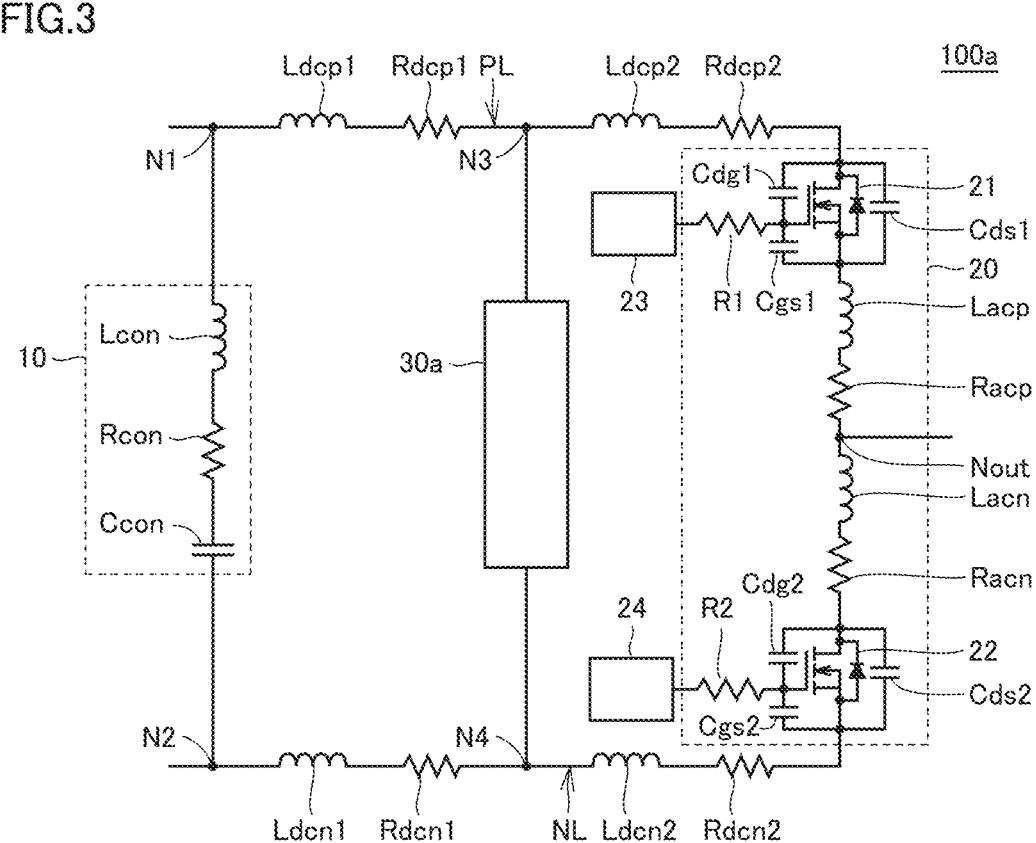
FIG. 3 is a circuit diagram showing a first example of a configuration of a power converter according to Embodiment 1.

FIG. 3 is a circuit diagram showing a first example of the configuration of the power converter according to Embodiment 1.

Referring to FIG. 3, a power converter 100a according to the first example of Embodiment 1 further includes an attenuator 30a for reducing or preventing the oscillatory false triggering in addition to the basic configuration shown in FIGS. 1 and 2.

Attenuator 30a is connected between a node N3 on power line PL and a node N4 on power line NL. In other words, attenuator 30a is connected in parallel with leg 20 and DC capacitor 10.

Node N3 is located between node N1 and the drain terminal of semiconductor switching element 21. Similarly, node N4 is located between node N2 and the source terminal of semiconductor switching element 22. Accordingly, resistive component Rdcp and inductive component Ldcp shown in FIG. 2 are respectively divided into resistive components Rdcp1 and Rdcp2 (Rdcp=Rdcp1+Rdcp2) and inductive components Ldcp1 and Ldcp2 (Ldcp=Ldcp1+Ldcp2) with node N3 as a boundary.

Similarly, resistive component Rdcn and inductive component Ldcn shown in FIG. 2 are respectively divided into resistive components Rdcn1 and Rdcn2 (Rdcn=Rdcn1+Rdcn2) and inductive components Ldcn1 and Ldcn2 (Ldcn=Ldcn1+Ldcn2) with node N4 as a boundary.

Figure 4:
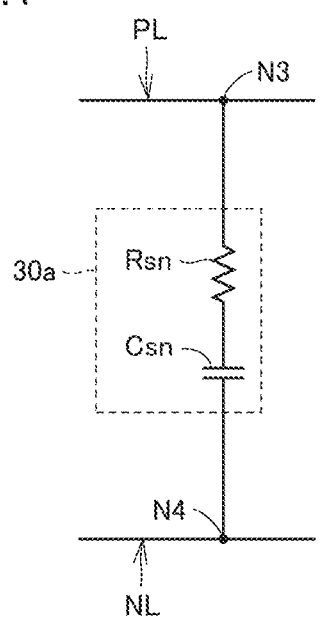
FIG. 4 is a circuit diagram for explaining an example configuration of an attenuator shown in FIG. 3.

FIG. 4 shows an example configuration of attenuator 30a shown in FIG. 3.

Referring to FIG. 4, attenuator 30a includes a series circuit of a resistive element Rsn and a capacitor Csn, which constitute a so-called snubber circuit. Resistive element Rsn and capacitor Csn are electrically connected between nodes N3 and N4. It should be noted that in the following, a resistance value of resistive element Rsn is also referred to as Rsn, and a capacitance value of capacitor Csn is also referred to as Csn.

Attenuator 30a is electrically connected to main circuit loops MLP1 and MLP2 in order to attenuate a resonance in main circuit loops MLP1 and MLP2 (FIG. 2) including a loop inductance including an equivalent series inductance (ESL) of DC capacitor 10 and semiconductor switching elements 21 and 22.

Attenuator 30a connected in parallel with main circuit loops MLP1 and MLP2 is configured such that a cutoff frequency fc is lower than a resonance frequency fr of main circuit loop MLP.

When drain-source capacitances of semiconductor switching elements 21 and 22 are such that Cds1=Cds2=Cds, resonance frequency fr of main circuit loop MLP is represented by Equation (1) below.

$$fr=1/(2\cdot\pi\cdot\sqrt{(Lr\cdot Cds)}) \qquad (1)$$

where Lr=Lcon+Ldcp+Lacp+Lacn+Ldcn.

Cutoff frequency fc of attenuator 30a is represented by Equation (2) below.

$$fc=1/(2\cdot\pi\cdot Rsn\cdot Csn) \qquad (2)$$

In other words, an admittance at the resonance frequency of main circuit loop MLP can be reduced by determining circuit constants Rsn and Csn of attenuator 30a such that fc<fr. As a result, the oscillatory false triggering phenomenon of semiconductor switching elements 21 and 22 can be reduced or prevented by enhancing the effect of attenuating voltage fluctuations generated in main circuit loop MLP during turn-off.

Figure 5:
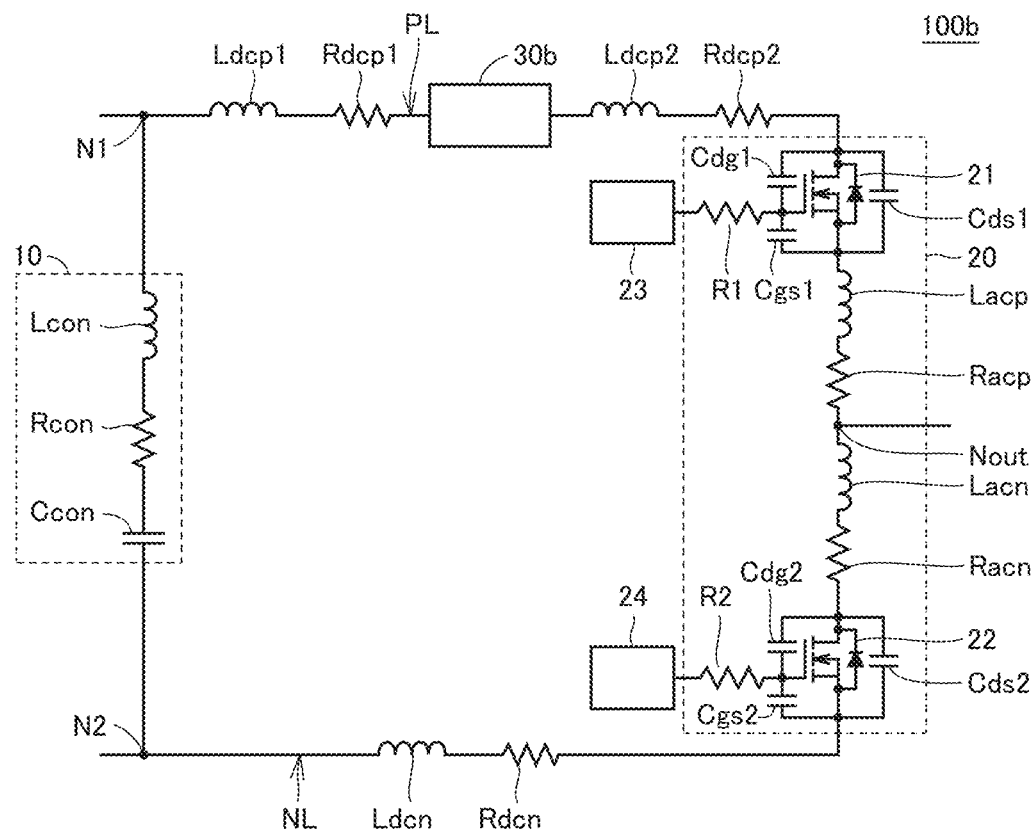
FIG. 5 is a circuit diagram showing a second example of the configuration of the power converter according to Embodiment 1.

FIG. 5 is a circuit diagram showing a second example of the configuration of the power converter according to Embodiment 1.

Referring to FIG. 5, a power converter 100b according to the second example of Embodiment 1 differs from power converter 100a shown in FIG. 3 in that an attenuator 30b is included in place of attenuator 30a. Attenuator 30b is connected in series with leg 20 and DC capacitor 10. For example, attenuator 30b is connected to power line PL. As a result, resistive component Rdcp and inductive component Ldcp shown in FIG. 2 are respectively divided into resistive components Rdcp1 and Rdcp2 (Rdcp=Rdcp1+Rdcp2) and inductive components Ldcp1 and Ldcp2 (Ldcp=Ldcp1+Ldcp2) with attenuator 30b as a boundary.

Figure 6:
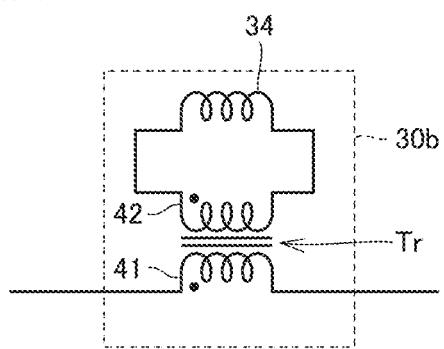
FIG. 6 is a circuit diagram for explaining an example configuration of an attenuator shown in FIG. 5.

FIG. 6 shows an example configuration of attenuator 30b shown in FIG. 5.

Referring to FIG. 6, attenuator 30b includes a transformer Tr and a magnetic snubber 34. Transformer Tr includes a primary winding 41 connected in series with power line PL and a secondary winding 42 magnetically coupled with primary winding 41. Primary winding 41 and secondary winding 42 are electrically insulated from each other. Magnetic snubber 34 is connected in series with secondary winding 42 and can be formed of, for example, a saturable reactor that can variably control a reactance or a ferrite bead in which a resistive component is dominant in a high-frequency area.

Attenuator 30b can have a configuration without a transformer. In such a case, saturable reactors that can variably control a reactance or ferrite beads in which a resistive component is dominant in a high-frequency area can be connected in series on power line PL or NL as attenuator 30b. Alternatively, attenuator 30b can be formed by disposing, around power line PL or NL, a ring-shaped core made of a ferrite material or the like having a characteristic in which a resistive component is dominant in a high-frequency area.

Attenuator 30b connected in series with main circuit loop MLP is configured such that an impedance at resonance frequency fr of main circuit loop MLP is higher than an impedance at the switching frequency of each of semiconductor switching elements 21 and 22. In other words, magnetic snubber 34 is selected to achieve such a frequency characteristic.

Disposing attenuator 30b can reduce a power loss in main circuit loop MLP due to switching of semiconductor switching elements 21 and 22 and also reduce an admittance at the resonance frequency of main circuit loop MLP. As a result, the oscillatory false triggering phenomenon of semiconductor switching elements 21 and 22 can be reduced or prevented by increasing the effect of attenuating voltage fluctuations generated in main circuit loop MLP during turn-off without reducing the efficiency in a normal switching operation.

It should be noted that attenuator 30b may be connected to power line NL or connected between DC capacitor 10 and power line PL or NL as long as attenuator 30b is connected in series with main circuit loop MLP. Further, attenuator 30b may be connected between semiconductor switching element 21 and power line PL, between semiconductor switching element 21 or 22 and node Nout, or between semiconductor switching element 22 and power line NL. Alternatively, attenuator 30b may be provided at multiple places. In other words, attenuator 30b can be provided in at least one of power lines PL and NL.

As described above, at least one of attenuator 30a connected in parallel with main circuit loop MLP and attenuator 30b connected in series with main circuit loop MLP is disposed in power converter 100a, 100b according to Embodiment 1. In other words, both of attenuators 30a and 30b can be connected to main circuit loop MLP.

As a result, the oscillatory false triggering phenomenon of semiconductor switching elements 21 and 22 can be reduced or prevented by reducing an admittance at the resonance frequency of main circuit loop MLP to enhance the effect of attenuating voltage fluctuations. This allows the power converter to stably perform a steady operation even when the semiconductor switching elements constituting the leg are turned on and off at high speed.

Although the semiconductor material of semiconductor switching elements 21 and 22 is not limited in the present embodiment as described above, the occurrence of the oscillatory false triggering can be reduced or prevented effectively also for a semiconductor switching element formed of a wide bandgap semiconductor, for example, GaN, which features a low voltage threshold and high-speed switching.

Embodiment 2

Figure 7:
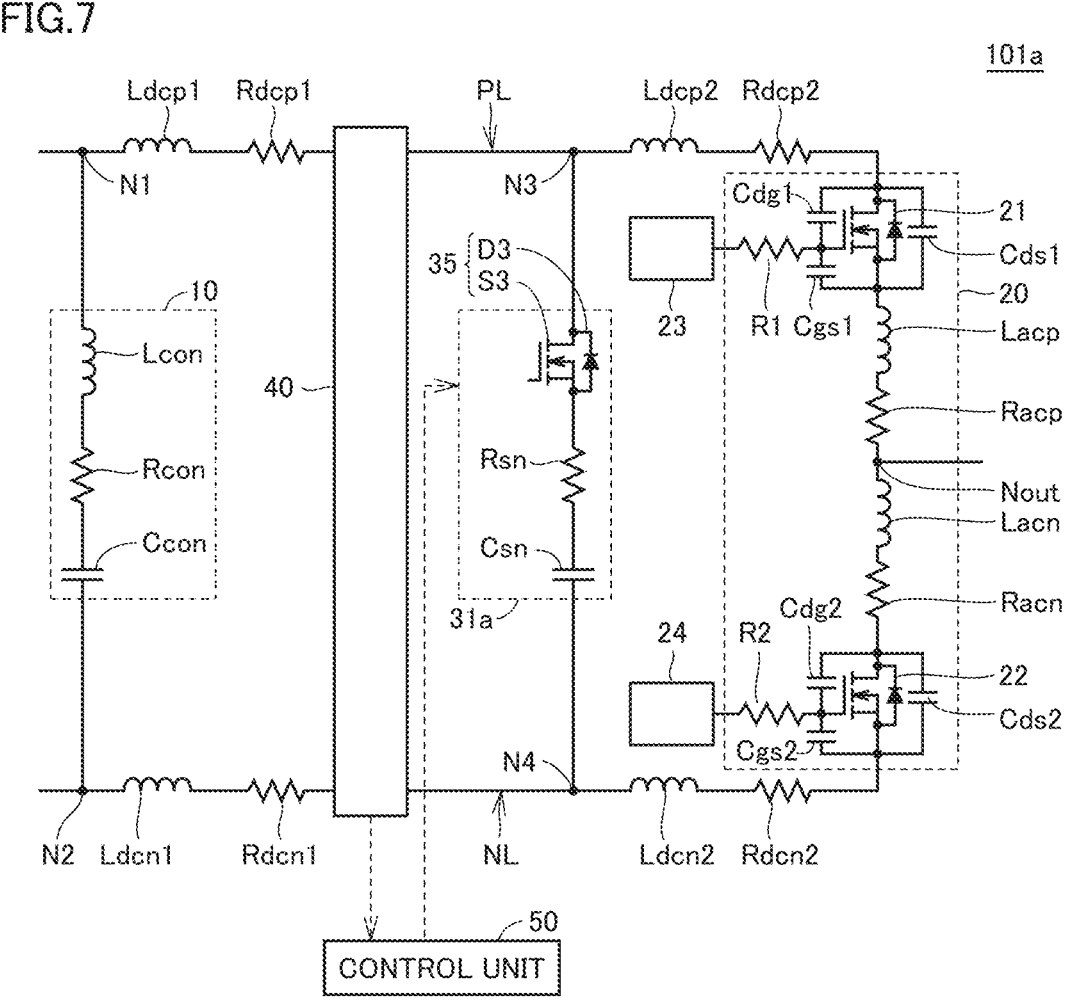
FIG. 7 is a circuit diagram showing a first example of a configuration of a power converter according to Embodiment 2.

FIG. 7 is a circuit diagram showing a first example of a configuration of a power converter according to Embodiment 2.

Referring to FIG. 7, a power converter 101a according to the first example of Embodiment 2 differs from power converter 100a shown in FIGS. 3 and 4 in that a detection unit 40 and a control unit 50 are further included and that an attenuator 31a is included in place of attenuator 30a.

Detection unit 40 is configured to detect a voltage and/or a current of each of power lines PL and NL. For example, detection unit 40 can detect a voltage across DC capacitor 10, and/or a current between DC capacitor 10 and leg 20.

Compared with attenuator 30a (FIG. 4), attenuator 31a includes an auxiliary switching element 35 connected in series with resistive element Rsn and capacitor Csn. Auxiliary switching element 35 includes a switch S3 and a diode D3 connected in anti-parallel with switch S3.

Switch S3 is turned on and off in accordance with a control signal from control unit 50. Hereinbelow, turn-on and turn-off of switch S3 are also referred to as turn-on and turn-off of auxiliary switching element 35. Auxiliary switching element 35 can be formed of a transistor (e.g., MOS-FET) or the like.

Control unit 50 receives an input of a detection value by detection unit 40. Control unit 50 thus generates a control signal of auxiliary switching element 35 in attenuator 31a in accordance with a detection value of a voltage and/or a current by detection unit 40.

During turn-on of auxiliary switching element 35, attenuator 31a functions with respect to main circuit loop MLP in a manner similar to that of attenuator 30a described in Embodiment 1. On the other hand, during turn-off of auxiliary switching element 35, current passage through resistive element Rsn and capacitor Csn in attenuator 31a is interrupted. In other words, no power loss occurs due to attenuator 31a during turn-off of auxiliary switching element 35.

For example, control unit 50 generates a control signal of auxiliary switching element 35 so as to turn on auxiliary switching element 35 when the voltage and/or the current detected by detection unit 40 is greater than a threshold determined in advance and turn off auxiliary switching element 35 during any other period. Commonly, the oscillatory false triggering of semiconductor switching elements 21 and 22 is likely to occur in high-voltage and large-current switching, and accordingly, the threshold can be determined in advance corresponding to a boundary of an operation area (voltage/current) in which the oscillatory false triggering easily occurs, in accordance with characteristics of semiconductor switching elements 21 and 22.

Figure 8:
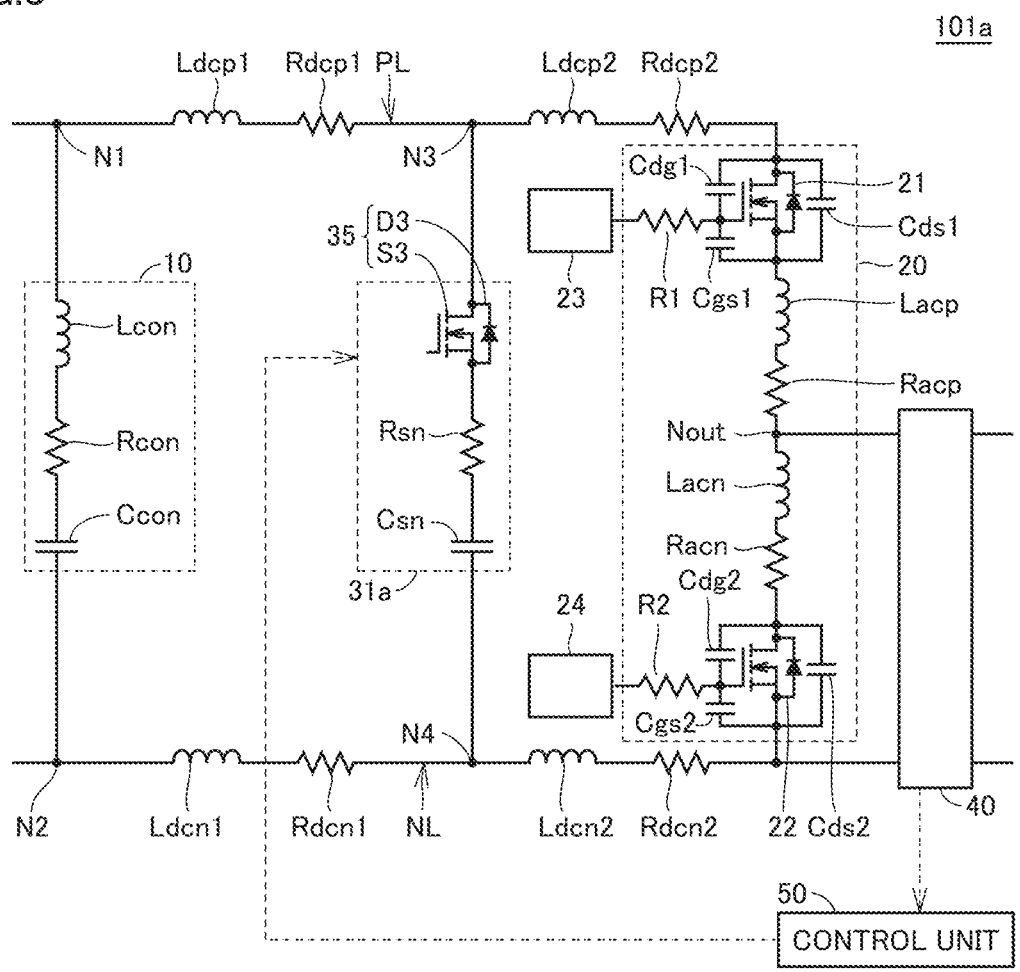
FIG. 8 is a circuit diagram for explaining a modification of an arrangement of a detection unit in the power converter shown in FIG. 7.

Alternatively, detection unit 40 can be disposed as in a modification shown in FIG. 8.

Referring to FIG. 8, detection unit 40 can detect a voltage and/or a current supplied from power line NL and node Nout to a load (not shown). Detection unit 40 of FIG. 8 is similar to that of FIG. 7 except for a place in which detection unit 40 is disposed, detailed description of which will not be repeated.

In other words, control unit 50 can control turn-on and turn-off of auxiliary switching element 35 in attenuator 31a based on the voltage and/or the current (i.e., the voltage and/or the current supplied from leg 20 to the load) detected by detection unit 40 and, for example, in accordance with a comparison with a threshold determined in advance.

In power converter 101a according to the first example of Embodiment 2, on the operating condition on which no oscillatory false triggering occurs, attenuator 31a connected in parallel with main circuit loop MLP can be separated from the current path. As a result, in addition to the effect of reducing or preventing the oscillatory false triggering by the power converter according to Embodiment 1, a power loss due to attenuator 31a can be reduced more than when attenuator 30a is included.

Figure 9:
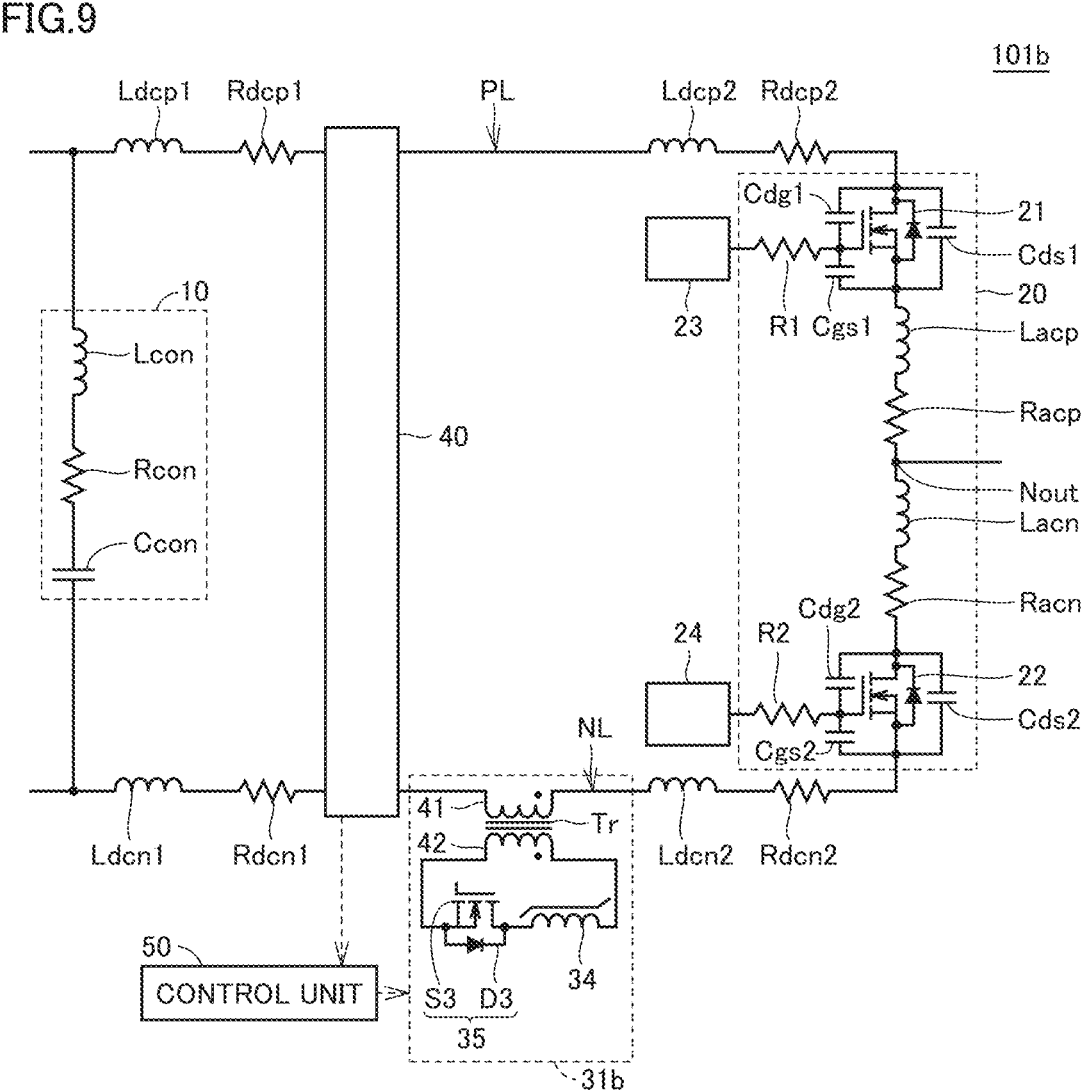
FIG. 9 is a circuit diagram showing a second example of the configuration of the power converter according to Embodiment 2.

FIG. 9 is a circuit diagram showing a second example of the configuration of the power converter according to Embodiment 2.

Referring to FIG. 9, a power converter 101b according to the second example of Embodiment 2 differs from power converter 100b shown in FIGS. 5 and 6 in that detection unit 40 and control unit 50 are further included and that an attenuator 31b is included in place of attenuator 30b. Although attenuator 31b can be disposed at any place as long as it is connected in series with the main circuit loop, in the example of FIG. 9, attenuator 31b is connected to power line NL. Attenuator 31b can be provided in at least one of power lines PL and NL similarly to attenuator 30b.

Compared with attenuator 30b (FIG. 6), attenuator 31b includes auxiliary switching element 35 connected in series with secondary winding 42 and magnetic snubber 34. Auxiliary switching element 35 is turned on and off in accordance with a control signal from control unit 50. Auxiliary switching element 35 can be formed of a transistor (e.g., MOS-FET) or the like.

Attenuator 31b functions with respect to main circuit loop MLP in a manner similar to that of attenuator 30b described in Embodiment 1, during turn-on of auxiliary switching element 35. On the other hand, during turn-off of auxiliary switching element 35, current passage through magnetic snubber 34 in attenuator 31b is interrupted, and accordingly, no power loss occurs due to magnetic snubber 34.

As described above, when attenuator 30b is configured by series connection of saturable reactors, ferrite beads, or the like on power line PL or NL without any transformer, attenuator 31b can be configured by connecting auxiliary switching element 35 with power line PL or NL in parallel with the components of attenuator 30b. In this case, as a path that bypasses the components of attenuator 30b is formed in power line PL or NL during turn-on of auxiliary switching element 35, no power loss occurs in the components.

Detection unit 40 is disposed as in FIG. 7 and is configured to detect a voltage and/or a current of each of power lines PL and NL. Control unit 50 receives an input of a detection value by detection unit 40.

Figure 10:
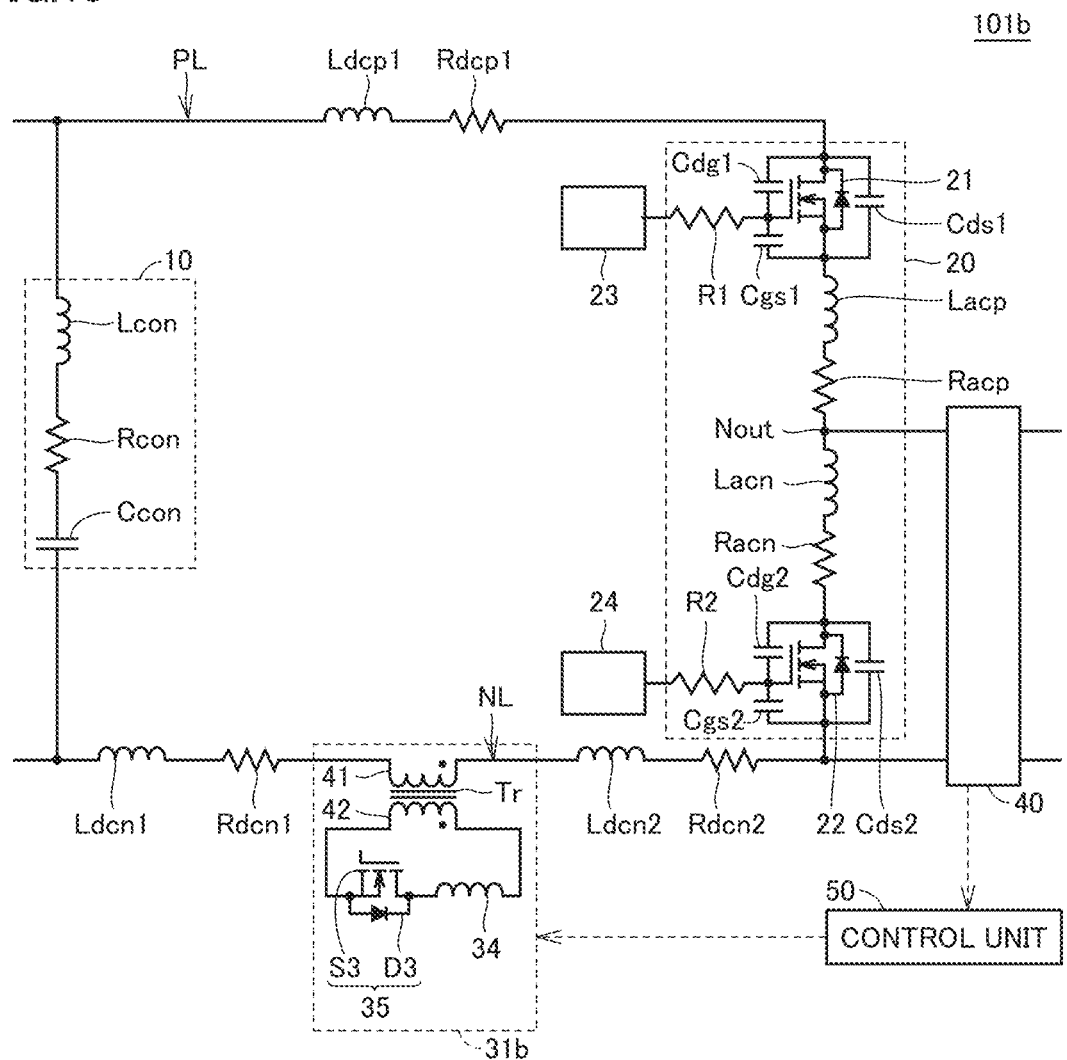
FIG. 10 is a circuit diagram for explaining a modification of an arrangement of the detection unit in the power converter shown in FIG. 7.

Alternatively, detection unit 40 can be disposed as in a modification shown in FIG. 10.

Referring to FIG. 10, detection unit 40 can detect a voltage and/or a current supplied from power line NL and node Nout to the load (not shown) as in FIG. 8. Detection unit 40 of FIG. 10 is similar to that of FIG. 8 except for a place in which detection unit 40 is disposed, detailed description of which will not be repeated.

In FIGS. 9 and 10, control unit 50 generates a control signal of auxiliary switching element 35 in attenuator 31b based on the detection value of the voltage and/or the current by detection unit 40 and, for example, in accordance with a comparison between the detection value and a threshold determined in advance, as in FIGS. 7 and 8.

In power converter 101b according to the second example of Embodiment 2, thus, on the operating condition on which no oscillatory false triggering occurs, attenuator 31b connected in series with main circuit loop MLP can interrupt the current of magnetic snubber 34. As a result, in addition to the effect of reducing or preventing the oscillatory false triggering by the power converter according to Embodiment 1, a power loss due to attenuator 31b can be reduced more than when attenuator 30b is included.

As described above, at least one of attenuator 31a connected in parallel with main circuit loop MLP and attenuator 31b connected in series with main circuit loop MLP is disposed in power converter 101a, 101b according to Embodiment 2. In other words, both of attenuators 31a and 31b can be connected to main circuit loop MLP.

As a result, in addition to the effects achieved by power converter 100a, 100b according to Embodiment 2, a period in which a current is generated in attenuator 31a, 31b for reducing or preventing the oscillatory false triggering is limited to a period in which the oscillatory false triggering is highly likely to occur. This enables high-efficiency power conversion with reduced power loss.

Embodiment 2 is particularly effectively applicable when the operating state (operating area) in which the oscillatory false triggering occurs is determined in advance for semiconductor switching elements 21 and 22.

Modification of Embodiment 2

Figure 11:
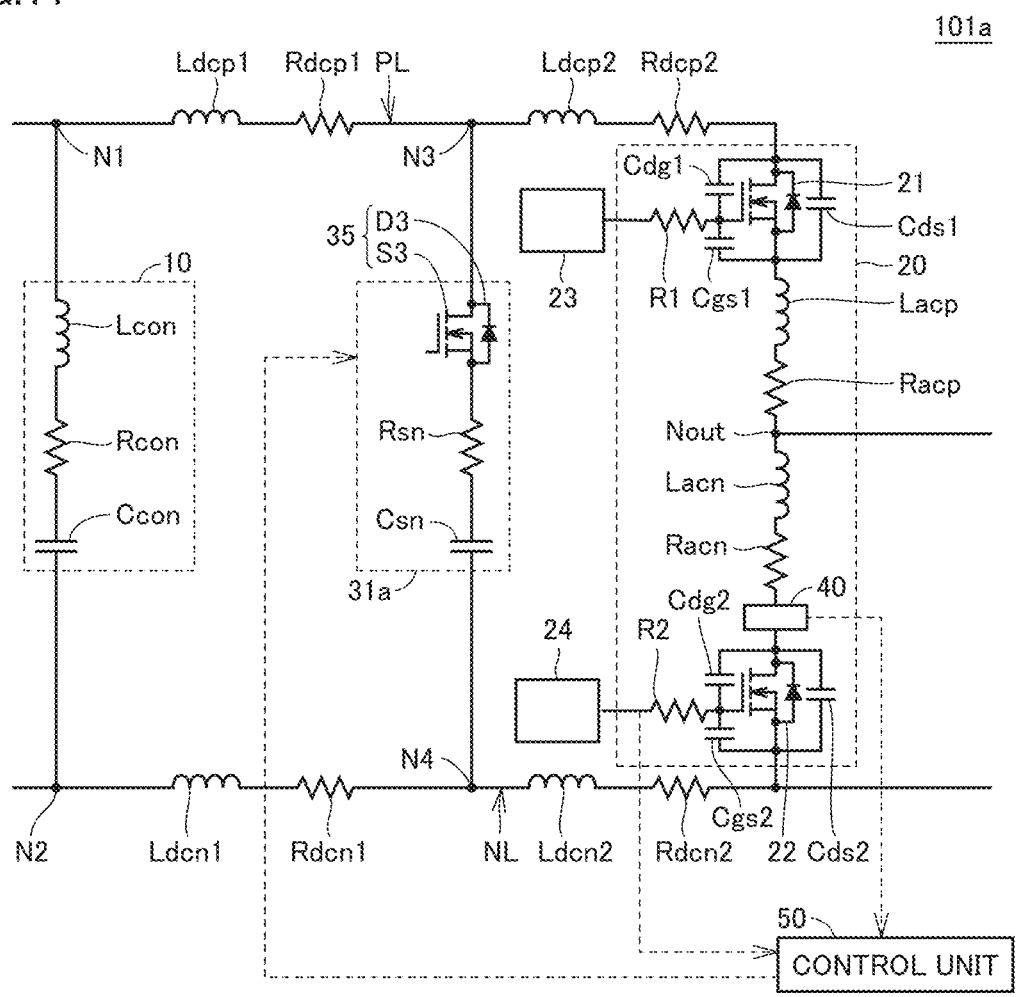
FIG. 11 is a circuit diagram showing a first example of a configuration of a power converter according to a modification of Embodiment 2.

FIG. 11 is a circuit diagram showing a first example of a configuration of a power converter according to a modification of Embodiment 2.

Referring to FIG. 11, in power converter 101a in which attenuator 31a and control unit 50 are disposed, detection unit 40 is disposed between semiconductor switching element 22 and node Nout. This allows detection unit 40 to directly detect a current flowing through semiconductor switching element 22. Alternatively, detection unit 40 may be disposed between node N4 and semiconductor switching element 22.

Control unit 50 further receives an input of a drive signal (voltage pulse) of semiconductor switching element 22 which is output from gate driver 24, in addition to a detection value (a current passing through semiconductor switching element 22) by detection unit 40.

During OFF period of semiconductor switching element 22 which is determined in accordance with the drive signal, control unit 50 can determine that the oscillatory false triggering is generated when a forward current is generated in semiconductor switching element 22, to thereby turn on auxiliary switching element 35 in attenuator 31a. On the other hand, during other periods, that is, during ON period of semiconductor switching element 22 which is determined in accordance with a drive signal and during a period in which no forward current is generated in semiconductor switching element 22 being turned-off, control unit 50 can bring auxiliary switching element 35 to OFF state.

Although FIG. 11 shows the example in which detection unit 40 is disposed to detect a current of semiconductor switching element 22, detection unit 40 can also be disposed between semiconductor switching element 21 and node Nout or between node N3 and semiconductor switching element 21 so as to directly detect a current of semiconductor switching element 21. In this case, control unit 50 further receives an input of a drive signal (voltage pulse) output from gate driver 23. Further, control unit 50 can turn on auxiliary switching element 35 in attenuator 31a when a forward current is generated in semiconductor switching element 21 during turn-off of semiconductor switching element 21 which is determined in accordance with the drive signal and turn off auxiliary switching element 35 during any other period.

Figure 12:
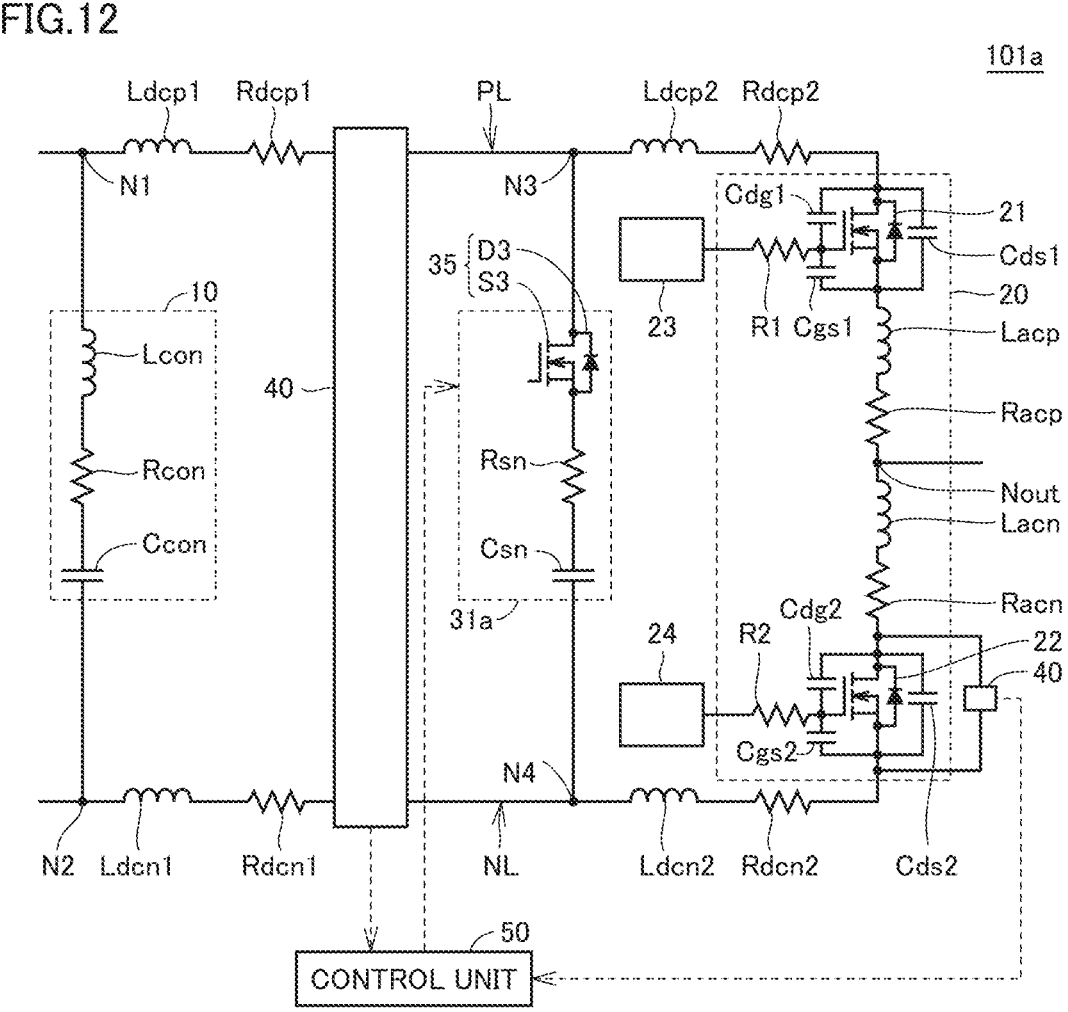
FIG. 12 is a circuit diagram showing a second example of the configuration of the power converter according to the modification of Embodiment 2.

FIG. 12 is a circuit diagram showing a second example of a configuration of a power converter according to a modification of Embodiment 2.

Referring to FIG. 12, in power converter 101a in which attenuator 31a and control unit 50 are disposed, detection unit 40 is disposed in parallel with a portion between the drain and the source of semiconductor switching element 22. This allows detection unit 40 to directly detect an applied voltage of semiconductor switching element 22. Moreover, detection unit 40 is also disposed between power lines PL and NL as in FIG. 7. As a result, a voltage of DC capacitor 10 is detected.

As in FIG. 11, control unit 50 further receives an input of a drive signal (voltage pulse) output from gate driver 24, in addition to a detection value by detection unit 40 (an applied voltage to semiconductor switching element 22 and a voltage of DC capacitor 10).

When the drain-source voltage of semiconductor switching element 22 is smaller than the voltage of DC capacitor 10 during turn-off of semiconductor switching element 22 which is determined in accordance with a drive signal, control unit 50 can determine that the oscillatory false triggering is generated, to thereby bring auxiliary switching element 35 to ON state. On the other hand, control unit 50 can bring auxiliary switching element 35 to OFF state during any other period. In other words, auxiliary switching element 35 is kept at OFF state during ON period of semiconductor switching element 22 which is determined in accordance with a drive signal.

Alternatively, detection unit 40 can be disposed in parallel with a portion between the drain and the source of semiconductor switching element 21, in addition to power lines PL and NL. In this case, detection unit 40 can directly detect an applied voltage of semiconductor switching element 21. In this case, control unit 50 further receives an input of a drive signal (voltage pulse) output from gate driver 23. Further, during OFF period of semiconductor switching element 21 which is determined in accordance with a drive signal, control unit 50 can turn on auxiliary switching element 35 in attenuator 31a when the drain-source voltage of semiconductor switching element 22 is smaller than the voltage of DC capacitor 10 and bring auxiliary switching element to OFF state during in any other period.

It should be noted that though detection unit 40 is disposed corresponding to only one of semiconductor switching elements 21 and 22 in FIGS. 11 and 12, detection unit 40 can also be disposed corresponding to both of semiconductor switching elements 21 and 22. In this case, control unit 50 can bring auxiliary switching element 35 to ON state when determining that the oscillatory false triggering is generated in accordance with the voltage or the current of each of semiconductor switching elements 21 and 22 during OFF period of semiconductor switching elements 21 and 22 which is determined based on the drive signals output from gate drivers 23 and 24.

As described above, in the modification of Embodiment 2, only when a voltage behavior or a current behavior, based on which it is determined that the oscillatory false triggering is generated during OFF period of each of semiconductor switching elements 21 and 22, is actually detected based on the detection value of the voltage or the current of each of semiconductor switching elements 21 and 22, auxiliary switching element 35 is turned on to reduce an admittance at the resonance frequency of main circuit loop MLP. Consequently, in addition to the effects described in Embodiment 2, a current loss can be reduced further with the action of each of attenuators 31a and 31b as the lowest limit.

The modification described with reference to FIGS. 11 and 12 is also applicable to power converter 101b (FIGS. 9 and 10) in which attenuator 31a and control unit 50 are disposed. Specifically, as detection unit 40 is disposed to detect the voltage or the current of semiconductor switching element 21 and/or 22, control unit 50 can turn on auxiliary switching element 35 in attenuator 31b only when the voltage behavior or the current behavior, based on which it is determined that the oscillatory false triggering is generated during OFF period of semiconductor switching elements 21 and 22, is detected.

Embodiment 3

Embodiment 3 will describe reduction or prevention of the oscillatory false triggering in a power converter including a plurality of parallel-connected legs.

Figure 13:
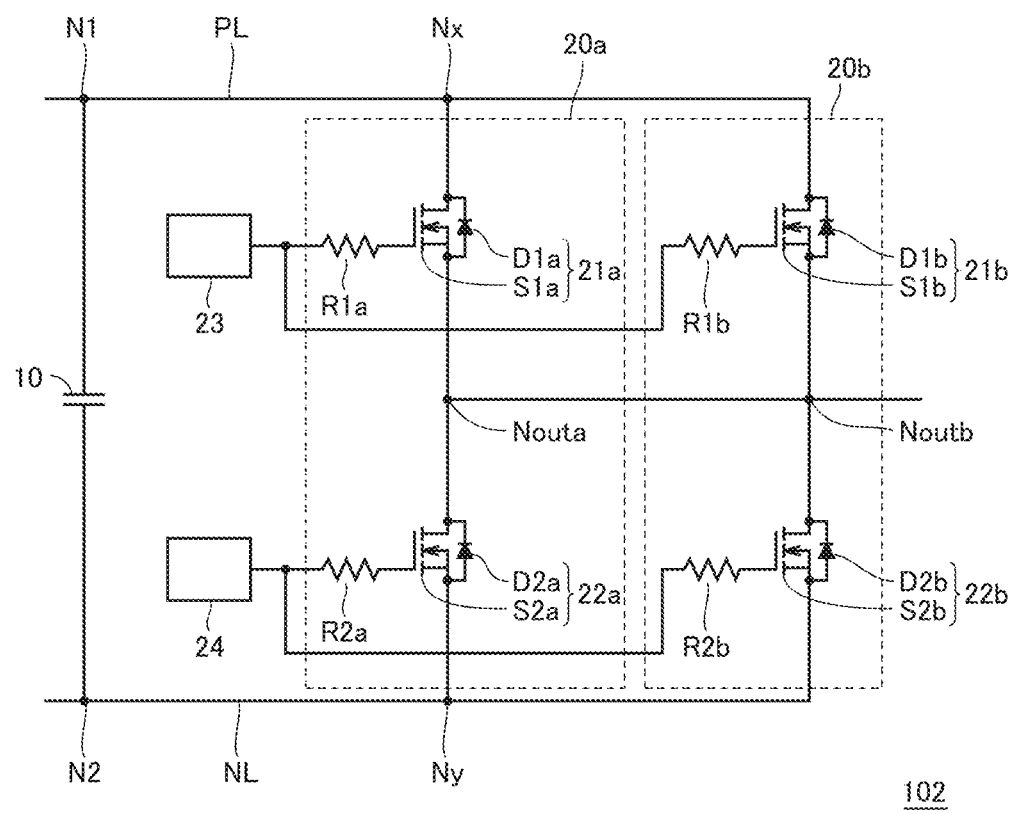
FIG. 13 is a circuit diagram showing a basic configuration of a power converter according to Embodiment 3.

FIG. 13 is a circuit diagram showing a basic configuration of a power converter to which Embodiment 3 is applied.

Referring to FIG. 13, a power converter 102 includes high-voltage-side power line PL and low-voltage-side power line NL, DC capacitor 10, legs 20a and 20b, and gate drivers 23 and 24. High-voltage-side power line PL and low-voltage-side power line NL are connected to a positive side and a negative side of a power supply (not shown).

Leg 20a includes semiconductor switching elements 21a and 22a connected in series between a node Nx on power line PL and a node Ny on power line NL with a node Nouta between semiconductor switching elements 21a and 22a. Semiconductor switching element 21a includes a switch S1a and a diode D1a connected in anti-parallel with switch S1a. A control electrode (gate) of switch S1a is connected to gate driver 23 with a gate resistor R1a therebetween. Similarly, semiconductor switching element 22a includes a switch S2a and a diode D2a connected in anti-parallel with switch S2a. A control electrode (gate) of switch S2a is connected to gate driver 24 with gate resistor R2a therebetween.

Similarly, leg 20b includes semiconductor switching elements 21b and 22b connected in series between power line PL (node Nx) and power line NL (node Ny) with a node Noutb between semiconductor switching elements 21b and 22b. Semiconductor switching element 21b is configured in a manner similar to that of semiconductor switching element 21, and includes a switch S1b and a diode D1b connected in anti-parallel with switch S1b. A control electrode (gate) of switch S1b is connected to gate driver 23 with a gate resistor R1b therebetween.

Similarly, semiconductor switching element 22b is configured in a manner similar to that of semiconductor switching element 22 and includes a switch S2b and a diode D2b connected in anti-parallel with switch S2b. A control electrode (gate) of switch S2b is connected to gate driver 24 with a gate resistor R2b therebetween.

Switches S1a and S1b are connected to a common gate driver 23 with gate resistors R1a and R2a therebetween, and switches S2a and S2b are connected to a common gate driver 24 with gate resistors R1b and R2b therebetween. Consequently, semiconductor switching elements 21a and 21b connected in parallel are controlled to be turned on and off in common. Similarly, semiconductor switching elements 22a and 22b are controlled to be turned on and off in common.

As described above, legs 20a and 20b are connected in parallel to power lines PL and NL and controlled to be turned on and off in common. Nodes Nouta and Noutb respectively correspond to "output ends" of legs 20a and 20b and are connected to a load with an inductor (not shown) and/or a capacitor (not shown) or the like therebetween.

Figure 14:
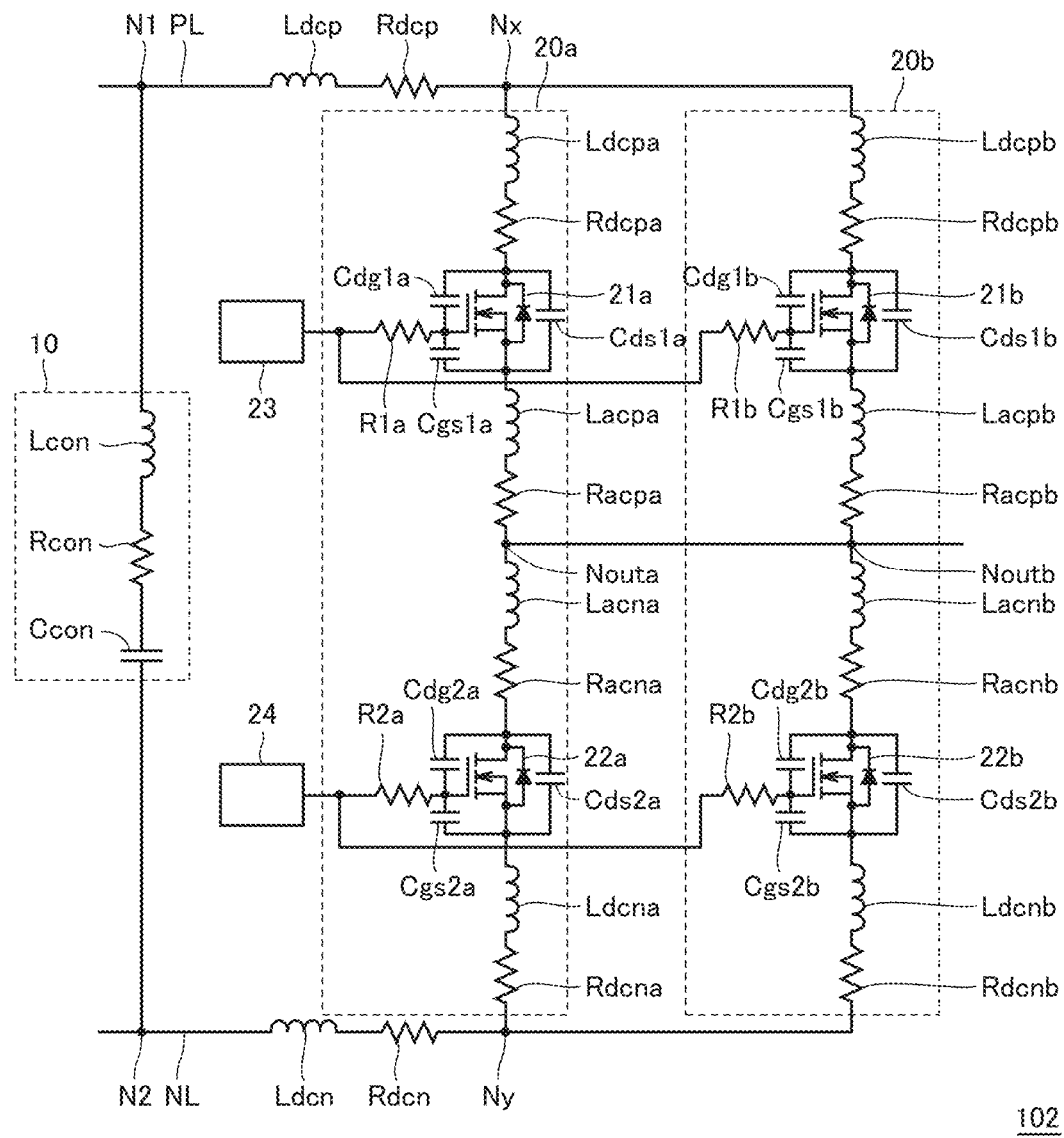
FIG. 14 is an equivalent circuit diagram in which parasitic components of the basic configuration shown in FIG. 13 are shown.

FIG. 14 shows an equivalent circuit diagram of a configuration shown in FIG. 3. In FIG. 14, parasitic components in the circuit are further shown.

Referring to FIG. 14, in leg 20a, a drain-source parasitic capacitance Cds1a, a drain-gate parasitic capacitance Cdg1a, and a gate-source parasitic capacitance Cgs1a are present as the capacitive component in semiconductor switching element 21a. A series circuit of Cdg1a and Cgs1a is connected in parallel with Cds1a. Similarly, a drain-source parasitic capacitance Cds2a, a drain-gate parasitic capacitance Cdg2a, and a gate-source parasitic capacitance Cgs2a are present as the capacitive component in semiconductor switching element 22a. A series circuit of Cdg2a and Cgs2a is connected in parallel with Cds2a.

Similarly, in leg 20b, a drain-source parasitic capacitance Cds1b, a drain-gate parasitic capacitance Cdg1b, and a gate-source parasitic capacitance Cgs1b are present as the capacitive component in semiconductor switching element 21b. A series circuit of Cdg1b and Cgs1b is connected in parallel with Cds1b. Similarly, a drain-source parasitic capacitance Cds2b, a drain-gate parasitic capacitance Cdg2b, and a gate-source parasitic capacitance Cgs2b are present as the capacitive component in semiconductor switching element 22b. A series circuit of Cdg2b and Cgs2b is connected in parallel with Cds2b.

In addition to FIG. 3, a resistive component Rdcpa and an inductive component Ldcpa are present between node Nx and the drain terminal of semiconductor switching element 21a, and a resistive component Rdcpb and an inductive component Ldcpb are present between node Nx and the drain terminal of semiconductor switching element 22a.

Also, resistive component Rdcna and inductive component Ldcna are present between node Ny and the source terminal of semiconductor switching element 22a, and a resistive component Rdcnb and an inductive component Ldcnb are present between node Ny and the source terminal of semiconductor switching element 22b.

Similarly, in addition to FIG. 3, a resistive component Racpa and an inductive component Lacpa are present between node Nouta and the source terminal of semiconductor switching element 21a, a resistive component Racna and an inductive component Lacna are present between node Noutb and the drain terminal of semiconductor switching element 22a. Similarly, a resistive component Racpb and an inductive component Lacpb are present between node Noutb and the source terminal of semiconductor switching element 21b, and a resistive component Racnb and an inductive component Lacnb are present between node Noutb and the drain terminal of semiconductor switching element 22b.

As described above, semiconductor switching elements 21a and 21b are turned on and off in common in response to a drive signal from gate driver 23, and semiconductor switching elements 22a and 22b are turned on and off in common in response to a drive signal from gate driver 24.

During turn-on of semiconductor switching elements 21a and 21b, semiconductor switching elements 22a and 22b are turned off, and accordingly, a main circuit loop corresponding to main circuit loop MLP1 of FIG. 2 is formed of DC capacitor 10, power line PL, semiconductor switching elements 21a and 22a (ON state), nodes Nouta and Noutb, drain-source parasitic capacitances Cds2a and Cds2b of semiconductor switching elements 22a and 22b, and power line NL.

On the other hand, during turn-on of semiconductor switching elements 22a and 22b, semiconductor switching elements 21a and 21b are turned off, and accordingly, a main circuit loop corresponding to main circuit loop MLP2 of FIG. 2 is formed of DC capacitor 10, power line PL, drain-source parasitic capacitances Cds1a and Cds1b of semiconductor switching elements 21a and 21b, node Nout, semiconductor switching elements 22a and 22b (on state), and power line NL.

It is understood that also in a configuration including a plurality of parallel-connected arms, the above main circuit loop forms a resonance circuit of the parasitic components shown in FIG. 13. In the resonance circuit of Embodiment 3, however, a resonance frequency fr # can be obtained by an approach similar to that of Equation (1) in consideration of Ldcpa+Lacpa and Ldcpb+Lacpb, and Ldcna+Lacna and Ldcnb+Lacnb being connected in parallel, and Cds2a and Cds2b or Cds1a and Cds1b being connected in parallel.

Figure 15:
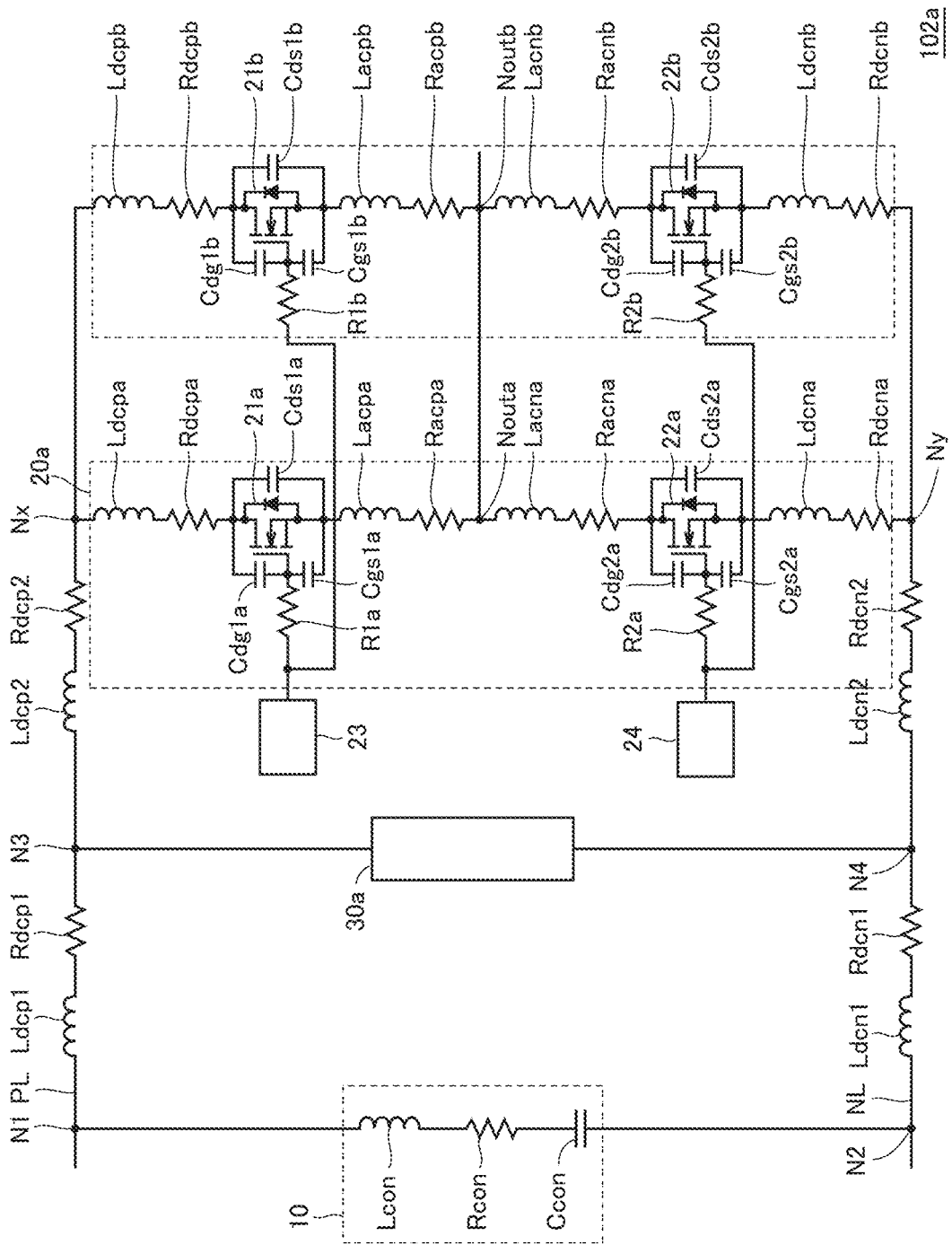
FIG. 15 is a circuit diagram showing a first example of the configuration of the power converter according to Embodiment 3.

FIG. 15 is a circuit diagram showing a first example of a configuration of a power converter according to Embodiment 3.

Referring to FIG. 15, a power converter 102a according to the first example of Embodiment 3 further includes attenuator 30a similar to that of FIG. 3, in addition to the basic configurations shown in FIGS. 13 and 14.

Attenuator 30a is connected between node N3 on power line PL and node N4 on power line NL as in FIG. 3. Attenuator 30a is connected in parallel with legs 20a and 20b and DC capacitor 10.

Node N3 is located between nodes N1 and Nx, and node N4 is located between nodes N2 and Ny. As in FIG. 3, resistive component Rdcp and inductive component Ldcp of power line PL are respectively divided into resistive components Rdcp1 and Rdcp2 (Rdcp=Rdcp1+Rdcp2) and inductive components Ldcp1 and Ldcp2 (Ldcp=Ldcp1+Ldcp2) with node N3 as a boundary. Similarly, resistive component Rdcn and inductive component Ldcn of power line NL are respectively divided into resistive components Rdcn1 and Rdcn2 (Rdcn=Rdcn1+Rdcn2) and inductive components Ldcn1 and Ldcn2 (Ldcn=Ldcn1+Ldcn2) with node N4 as a boundary.

As cutoff frequency fc of attenuator 30a connected as shown in FIG. 15 is made smaller than resonance frequency fr #, the effect of attenuating voltage fluctuations generated in main circuit loop MLP during turn-off can be enhanced.

As a result, according to Embodiment 3, the oscillatory false triggering phenomenon of semiconductor switching elements 21a, 21b, 22a, and 22b can be reduced or prevented also in the configuration including parallel-connected legs 20a and 20b.

Figure 16:
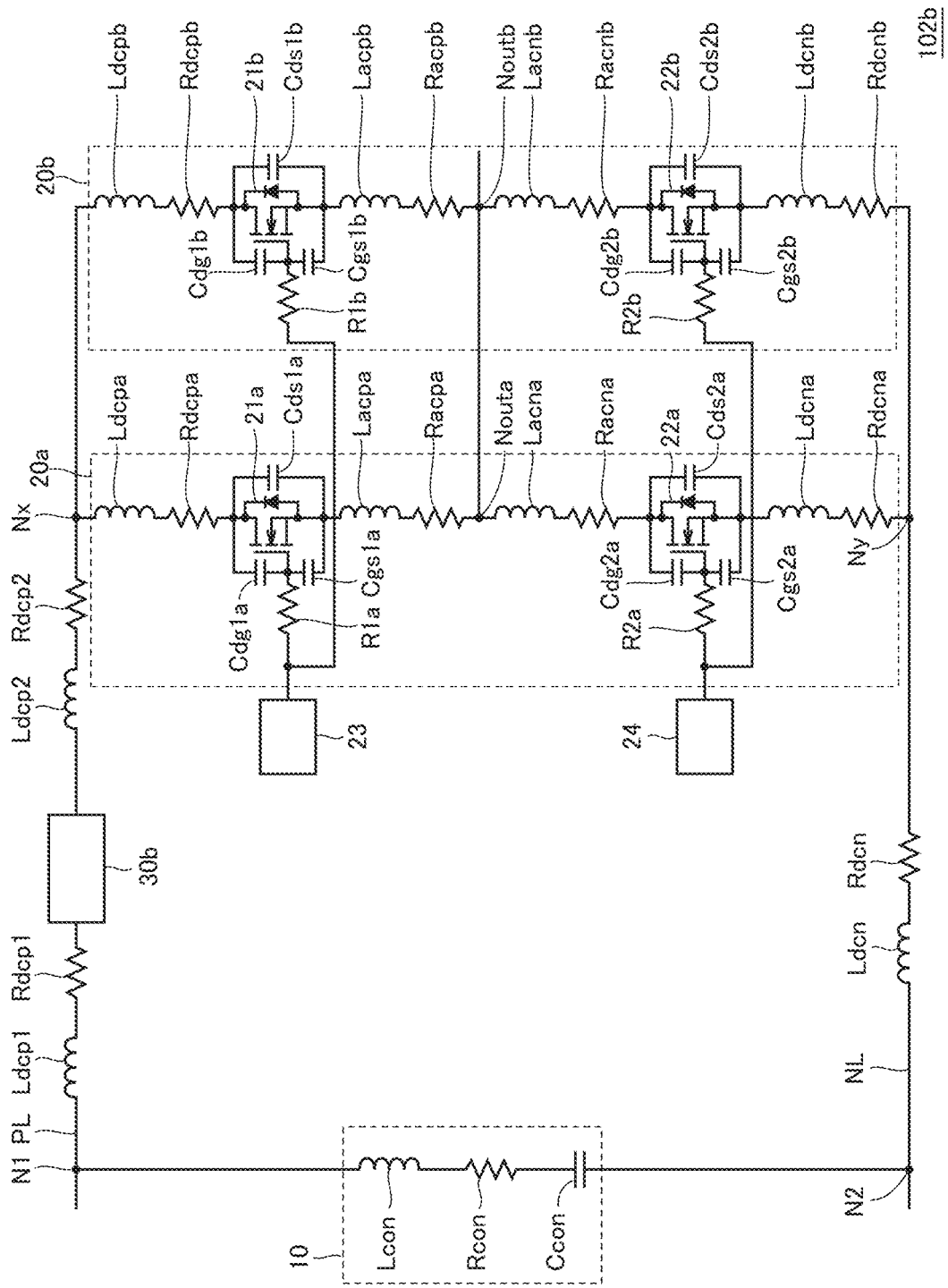
FIG. 16 is a circuit diagram showing a second example of the configuration of the power converter according to Embodiment 3.

FIG. 16 is a circuit diagram showing a second example of the configuration of the power converter according to Embodiment 3.

Referring to FIG. 16, a power converter 102b according to the second example of Embodiment 3 further includes attenuator 30b similar to that of FIG. 5 in addition to the basic configurations shown in FIGS. 13 and 14.

Attenuator 30b is connected in series with both of legs 20a and 20b and a series capacitor. For example, as attenuator 31b1 is connected to power line PL, resistive component Rdcp and inductive component Ldcp are respectively divided into resistive components Rdcp1 and Rdcp2 (Rdcp=Rdcp1+Rdcp2) and inductive components Ldcp1 and Ldcp2 (Ldcp=Ldcp1+Ldcp2) with attenuator 30b as a boundary, as in FIG. 5.

Attenuator 30b connected as shown in FIG. 16 is configured such that an impedance at resonance frequency fr # is higher than the impedances at the switching frequencies of semiconductor switching elements 21a, 22a, 21b, and 22b. This reduces or prevents a power loss in the main circuit loop due to switching of semiconductor switching elements 21a, 22a, 21b, and 22b and also reduces an admittance of the main circuit loop at resonance frequency fr #.

As a result, according to Embodiment 3, the oscillatory false triggering phenomenon of semiconductor switching elements 21a, 21b, 22a, and 22b can be reduced or prevented without reducing efficiency in a normal switching operation also in the configuration including parallel-connected legs 20a and 20b.

It should be noted that attenuator 30b may be connected to power line NL or connected between DC capacitor 10 and power line PL or NL as long as it is connected in series with both of legs 20a and 20b.

Modification of Embodiment 3

Figure 17:
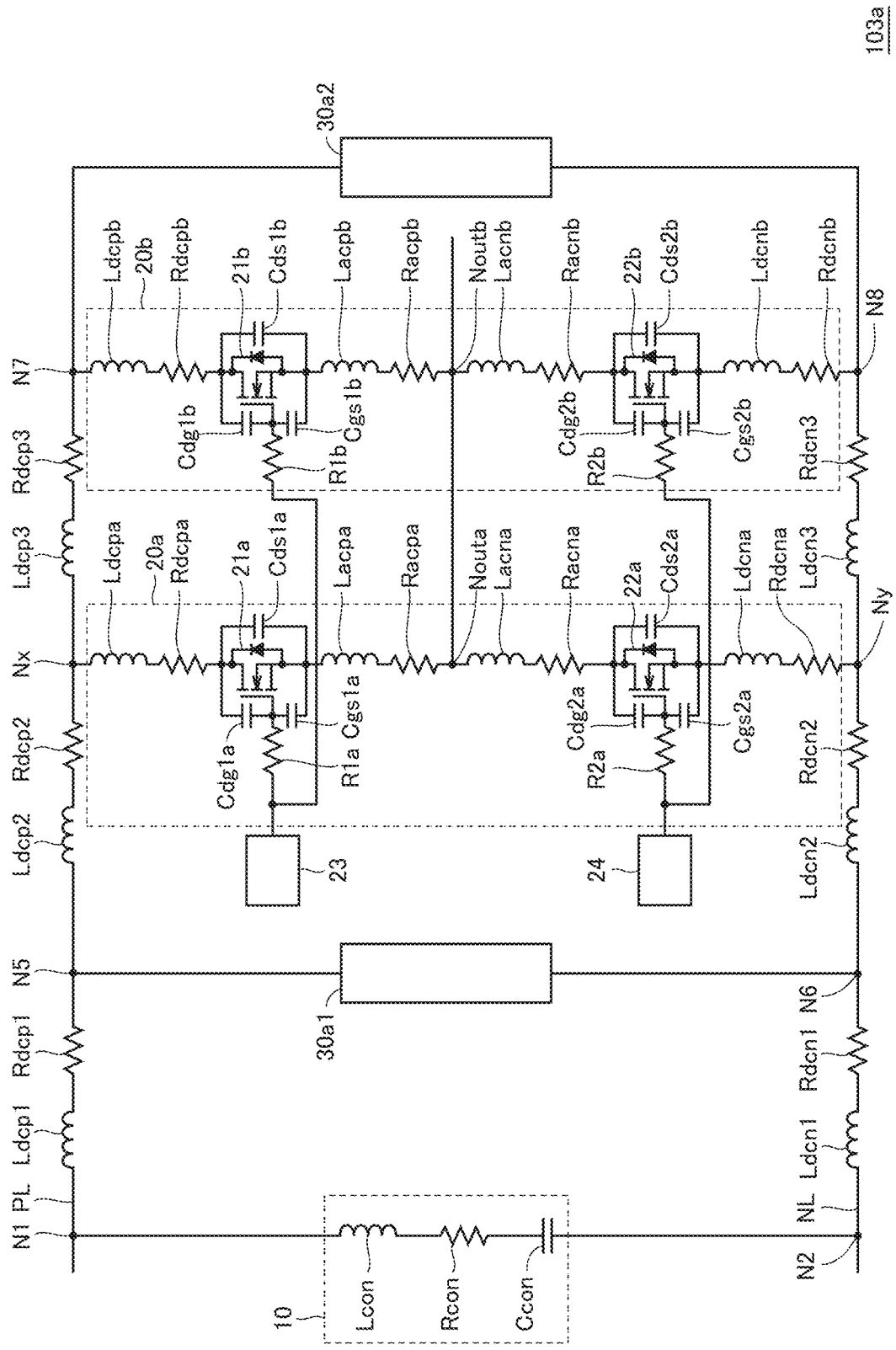
FIG. 17 is a circuit diagram showing a first example of a configuration of a power converter according to a modification of Embodiment 3.

FIG. 17 is a circuit diagram showing a first example of a configuration of a power converter according to a modification of Embodiment 3.

Referring to FIG. 17, a power converter 103a according to the first example of the modification of Embodiment 3 differs from power converter 102a of FIG. 15 in that attenuator 30a is disposed for each of parallel-connected legs.

In the example configuration of FIG. 17, a parallel attenuator 30a1 is connected in parallel with leg 20a between nodes N5 and N6, and a attenuator 30a2 is connected in parallel with leg 20b between nodes N7 and N8.

In FIG. 17, node Nx is located between nodes N5 and N7, and node Ny is located between nodes N6 and N8. Resistive component Rdcp and inductive component Ldcp of power line PL are respectively divided into resistive components Rdcp1 to Rdcp3 (Rdcp=Rdcp1+Rdcp2+Rdcp3) and inductive components Ldcp1 to Ldcp3 (Ldcp=Ldcp1+Ldcp2+Ldcp3) with nodes N5 and Nx as boundaries. Similarly, resistive component Rdcn and inductive component Ldcn of power line NL are respectively divided into resistive components Rdcn1 to Rdcn3 (Rdcn=Rdcn1+Rdcn2+Rdcn3) and inductive components Ldcn1 to Ldcn3 (Ldcn=Ldcn1+Ldcn2+Ldcn3) with nodes N6 and Ny as boundaries.

The circuit configuration and cutoff frequency fc of each of attenuators 30a1 and 30a2 can be configured similar to those of attenuator 30a in FIG. 15.

As described above, as attenuator 30a is disposed for each of the legs, the effect of reducing or preventing the oscillatory false triggering phenomenon of semiconductor switching elements 21a, 21b, 22a, and 22b of legs 20a and 20b can be enhanced more than in Embodiment 3 (FIG. 15).

Figure 18:
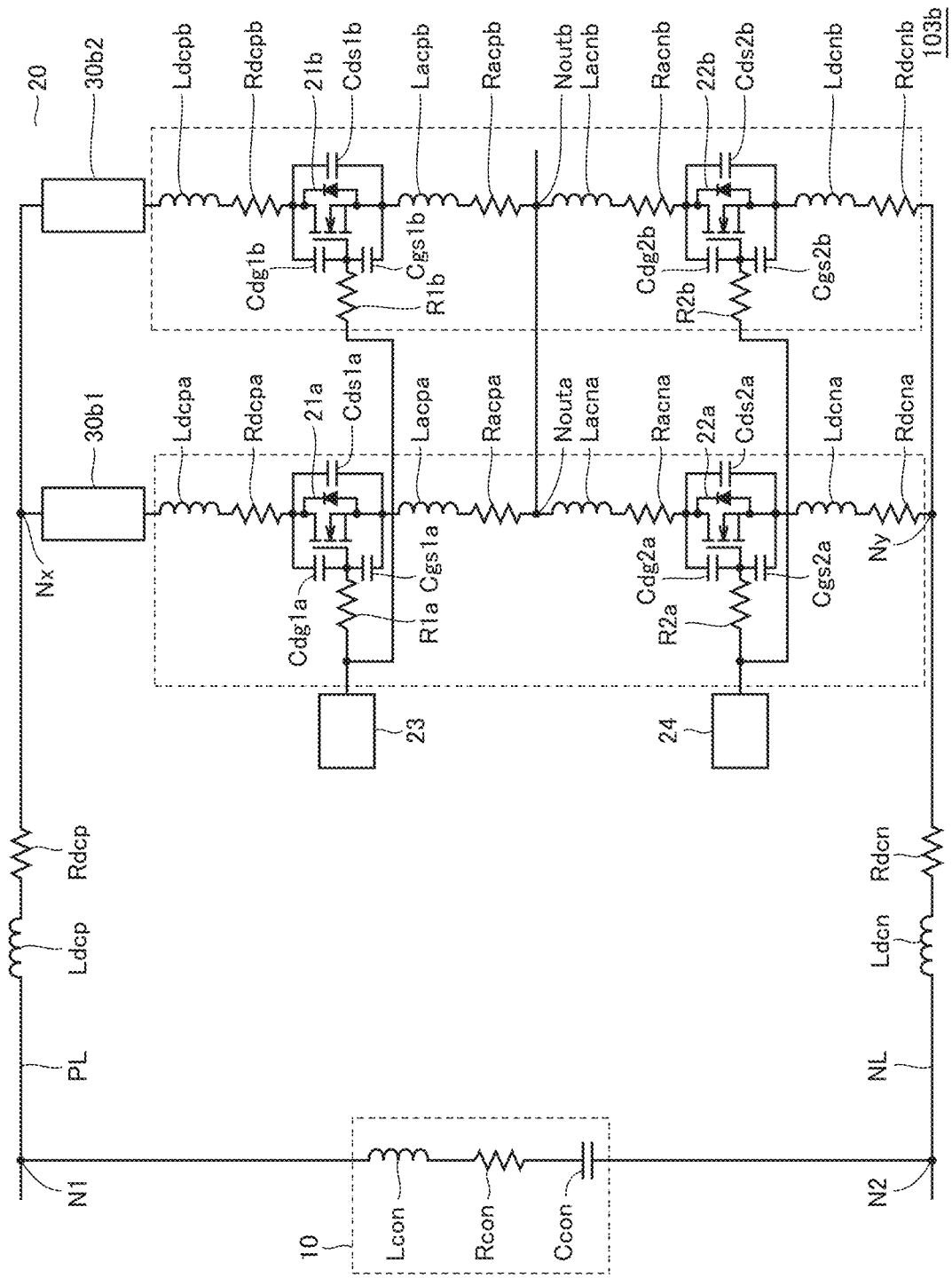
FIG. 18 is a circuit diagram showing a second example of the configuration of the power converter according to the modification of Embodiment 3.

FIG. 18 is a circuit diagram showing a second example of a configuration of a power converter according to a modification of Embodiment 3.

Referring to FIG. 18, a power converter 103b according to the second example of the modification of Embodiment 3 differs from power converter 102b of FIG. 16 in that attenuator 30b is disposed for each of the parallel-connected legs.

In the example configuration of FIG. 18, an attenuator 30b1 is connected between node Nx (power line PL) and leg 20a (the drain of semiconductor switching element 21a), and an attenuator 30b2 is connected between node Nx (power line PL) and leg 20b (the drain of semiconductor switching element 21b).

The circuit configuration and frequency characteristics of impedance of each of attenuators 30b1 and 30b2 are configured similar to those of attenuator 30b in FIG. 16. It should be noted that attenuator 30b1 may be connected between node Ny (power line NL) and leg 20a (the source of semiconductor switching element 22a). Similarly, attenuator 30b2 may be connected between node Ny (power line NL) and leg 20b (the source of semiconductor switching element 22b).

As described above, as attenuator 30b is disposed for each of the legs, the effect of reducing or preventing the oscillatory false triggering phenomenon of semiconductor switching elements 21a, 21b, 22a, and 22b of legs 20a and 20b can be enhanced more than in Embodiment 3 (FIG. 16).

In Embodiment 3 and the modifications thereof, each of attenuators 30a, 30a1, and 30a2 can be replaced with attenuator 31a including auxiliary switching element 35, which has been described in Embodiment 2, in addition to disposing detection unit 40 and control unit 50. Similarly, each of attenuators 30b, 30b1, and 30b2 can be replaced with attenuator 31b including auxiliary switching element 35, which has been described in Embodiment 2, in addition to configuring detection unit 40 and control unit 50.

FIGS. 13 to 18 show the configuration in which semiconductor switching elements connected in parallel between legs are driven by a common gate driver through an individual gate resistor. However, each semiconductor switching element can be driven by an individual gate driver through an individual gate resistor as long as the parallel-connected semiconductor switching elements are turned on and off in common. Alternatively, parallel-connected semiconductor switching elements can be driven by a common gate drive through a common gate resistor.

In the embodiments and the modifications thereof descried above, one of semiconductor switching elements 21 and 22 can be configured by a diode without a switch. Power converters 100a and 100b are also applicable to a configuration of a full bridge, a three-leg inverter, or the like.

As described in the embodiments and the modifications thereof, the attenuator can be connected in parallel with (30a, 31a) or connected in series (30b, 31b) with legs 20 (20a, 20b) and the DC capacitor. However, considering a power loss, attenuators 30a and 31a connected in parallel are advantageously used in the case of large current, whereas attenuators 30b and 31b connected in series are advantageously used in the case of high voltage.

For the purpose of clarification, it has been initially intended at the time of filing of the present application to appropriately combine the configurations described in a plurality of embodiments described above, including any combination not mentioned in the specification, within a range free of inconsistency or contradiction.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

REFERENCE SIGNS LIST

10: DC capacitor; 20, 20a, 20b: leg; 21, 22: semiconductor switching element; 23, 24: gate driver; 30a, 30a1, 30a2, 30b, 30b1, 30b2, 31a, 31b: attenuator; 34: magnetic snubber; 35: auxiliary switching element; 40: detection unit; 41: primary winding; 42: secondary winding; 50: control unit; 100, 100a, 100b, 101a, 101b: power converter; Cdg1, Cdg1a, Cdg1b, Cdg2, Cdg2a, Cdg2b: drain-gate parasitic capacitance; Cds1, Cds1a, Cds1b, Cds2, Cds2a, Cds2b: drain-source parasitic capacitance; Cgs1, Cgs1a, Cgs1b, Cgs2, Cgs2a, Cgs2b: gate-source parasitic capacitance; Csn: capacitor (attenuator); D1-D3: diode; MLP1, MLP2: main circuit loop; N1-N6, No, Nout, Nx, Ny: node; NL, PL: power line; R1: gate resistor; Rsn: resistive element (attenuator); S1, S2, S3: switch; Tr: transformer.

The invention claimed is:

1. A power converter comprising:
   a first power line on a high-voltage side;
   a second power line on a low-voltage side;
   a DC capacitor connected between the first and second power lines;
   a leg connected in parallel with the DC capacitor between the first and second power lines, the leg including a plurality of semiconductor switching elements each being formed of a wide bandgap semiconductor,
   the plurality of semiconductor switching elements being connected in series between the first and second power lines with an output end between the plurality of semiconductor switching elements, the output end being connected with a load; and
   an attenuator connected to a main circuit loop for attenuating a voltage fluctuation generated by a resonance due to a parasitic component of the main circuit loop, the main circuit loop being formed of the DC capacitor, the first and second power lines, a semiconductor switching element in ON state among the plurality of semiconductor switching elements, the output end, and a drain-source parasitic capacitance of a semiconductor switching element in OFF state among the plurality of semiconductor switching elements, wherein
   the attenuator has impedance characteristics that the voltage fluctuation generated in the main circuit loop is less than a voltage threshold at which each of the plurality of semiconductor switching elements turns ON, when the semiconductor switching element in ON state turns OFF.

2. The power converter according to claim 1, wherein the attenuator is connected in parallel with the leg and the DC capacitor between the first and second power lines and is configured to have a cutoff frequency lower than a resonance frequency of the main circuit loop.

3. The power converter according to claim 2, wherein the attenuator includes a resistive element and a capacitive element connected in series between the first and second power lines.

4. The power converter according to claim 1, wherein
the attenuator is connected in series with the leg and the DC capacitor in at least one of the first and second power lines, and
the attenuator is configured such that an impedance at a resonance frequency of the main circuit loop is higher than an impedance at a switching frequency of each of the plurality of semiconductor switching elements.

5. The power converter according to claim 4, wherein the attenuator includes a magnetic snubber.

6. A power converter comprising:
a first power line on a high-voltage side;
a second power line on a low-voltage side;
a DC capacitor connected between the first and second power lines;
a leg connected in parallel with the DC capacitor between the first and second power lines, the leg including a plurality of semiconductor switching elements each being formed of a wide bandgap semiconductor,
the plurality of semiconductor switching elements being connected in series between the first and second power lines with an output end between the plurality of semiconductor switching elements, the output end being connected with a load; and
an attenuator connected to a main circuit loop for attenuating a resonance due to a parasitic component of the main circuit loop, the main circuit loop being formed of the DC capacitor, the first and second power lines, a semiconductor switching element in ON state among the plurality of semiconductor switching elements, the output end, and a drain-source parasitic capacitance of a semiconductor switching element in OFF state among the plurality of semiconductor switching elements, wherein
the attenuator is connected in series with the leg and the DC capacitor in at least one of the first and second power lines, and
the attenuator is configured such that an impedance at a resonance frequency of the main circuit loop is higher than an impedance at a switching frequency of each of the plurality of semiconductor switching elements.

7. The power converter according to claim 6, wherein the attenuator includes a magnetic snubber.

8. The power converter according to claim 1, wherein
the attenuator includes an auxiliary switching element for interrupting current passage through the attenuator, and
the power converter further comprises:
a detector disposed at least one of between the first and second power lines and between the output end and the second power line; and
a controller to control turn-on and turn-off of the auxiliary switching element based on a detection value of a voltage or a current by the detector.

9. The power converter according to claim 8, wherein the controller turns on the auxiliary switching element when the detection value is greater than a threshold determined in advance, and turns off the auxiliary switching element when the detection value is smaller than the threshold.

10. The power converter according to claim 1, wherein
the attenuator includes an auxiliary switching element for interrupting current passage through the attenuator, and
the power converter further comprises:
a detector disposed to detect a voltage or a current of one semiconductor switching element among the plurality of semiconductor switching elements; and
a controller to control turn-on and turn-off of the auxiliary switching element using a drive signal for controlling turn-on and turn-off of the one semiconductor switching element and a detection value of a voltage or a current by the detector.

11. The power converter according to claim 10, wherein
the detector is disposed to detect a current of the one semiconductor switching element, and
when a forward current is detected in the one semiconductor switching element according to the detection value during turn-off of the one semiconductor switching element which is determined based on the drive signal, the controller changes the auxiliary switching element from OFF state to ON state.

12. The power converter according to claim 10, wherein
the detector is disposed to detect a drain-source voltage of the one semiconductor switching element, and
when the drain-source voltage of the one semiconductor switching element being lower than a voltage of the DC capacitor is detected according to the detection value during OFF period of the one semiconductor switching element which is determined based on the drive signal, the controller changes the auxiliary switching element from OFF state to ON state.

13. A power converter comprising:
a first power line on a high-voltage side;
a second power line on a low-voltage side;
a DC capacitor connected between the first and second power lines;
a leg connected in parallel with the DC capacitor between the first and second power lines, the leg including a plurality of semiconductor switching elements each being formed of a wide bandgap semiconductor,
the plurality of semiconductor switching elements being connected in series between the first and second power lines with an output end between the plurality of semiconductor switching elements, the output end being connected with a load; and
an attenuator connected to a main circuit loop for attenuating a resonance due to a parasitic component of the main circuit loop, the main circuit loop being formed of the DC capacitor, the first and second power lines, a semiconductor switching element in ON state among the plurality of semiconductor switching elements, the output end, and a drain-source parasitic capacitance of a semiconductor switching element in OFF state among the plurality of semiconductor switching elements, wherein
the attenuator includes an auxiliary switching element for interrupting current passage through the attenuator, and
the power converter further comprises:
a detector disposed to detect a voltage or a current of one semiconductor switching element among the plurality of semiconductor switching elements; and
a controller to control turn-on and turn-off of the auxiliary switching element using a drive signal for controlling turn-on and turn-off of the one semiconductor switching element and a detection value of a voltage or a current by the detector, wherein the detector is disposed to detect a current of the one semiconductor switching element, and when a forward current is detected in the one semiconductor switching element according to the detection value during turn-off of the one semiconductor switching element which is determined based on the drive signal, the controller changes the auxiliary switching element from OFF state to ON state.

14. The power converter according to claim 1, wherein the power converter comprises a plurality of the legs, the plurality of legs are connected in parallel between the first and second power lines, the attenuator is connected to the main circuit loop formed of the first and second power lines, a semiconductor switching element in ON state among the plurality of legs, the output end, and a drain-source parasitic capacitance of a semiconductor switching element in OFF state among the plurality of legs and attenuates the resonance due to the parasitic component of the main circuit loop.

15. The power converter according to claim 14, wherein the attenuator is disposed for each of the plurality of legs.

16. The power converter according to claim 6, wherein the power converter comprises a plurality of the legs, the plurality of legs are connected in parallel between the first and second power lines, the attenuator is connected to the main circuit loop formed of the first and second power lines, a semiconductor switching element in ON state among the plurality of legs, the output end, and a drain-source parasitic capacitance of a semiconductor switching element in OFF state among the plurality of legs and attenuates the resonance due to the parasitic component of the main circuit loop.

17. The power converter according to claim 16, wherein the attenuator is disposed for each of the plurality of legs.

18. The power converter according to claim 13, wherein the power converter comprises a plurality of the legs, the plurality of legs are connected in parallel between the first and second power lines, the attenuator is connected to the main circuit loop formed of the first and second power lines, a semiconductor switching element in ON state among the plurality of legs, the output end, and a drain-source parasitic capacitance of a semiconductor switching element in OFF state among the plurality of legs and attenuates the resonance due to the parasitic component of the main circuit loop.

19. The power converter according to claim 18, wherein the attenuator is disposed for each of the plurality of legs.

* * * * *